(12) United States Patent
Lukyanitsa

(10) Patent No.: US 7,342,721 B2
(45) Date of Patent: *Mar. 11, 2008

(54) COMPOSITE DUAL LCD PANEL DISPLAY SUITABLE FOR THREE DIMENSIONAL IMAGING

(75) Inventor: Andrew Lukyanitsa, Moscow (RU)

(73) Assignee: iZ3D LLC, San Diego, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 10/945,425

(22) Filed: Sep. 21, 2004

(65) Prior Publication Data

US 2005/0146787 A1 Jul. 7, 2005

Related U.S. Application Data

(63) Continuation-in-part of application No. 10/751,654, filed on Jan. 6, 2004, now Pat. No. 6,985,290, which is a continuation-in-part of application No. 09/977,462, filed on Oct. 15, 2001, now Pat. No. 6,717,728, which is a continuation-in-part of application No. 09/456,826, filed on Dec. 8, 1999, now abandoned.

(51) Int. Cl.
*G02B 27/22* (2006.01)
*G09G 5/00* (2006.01)
*G03B 21/56* (2006.01)
*G03B 21/26* (2006.01)

(52) U.S. Cl. ............... 359/462; 359/449; 359/460; 353/7; 353/30; 345/6

(58) Field of Classification Search ............ 359/462, 359/443, 449, 460; 353/7, 30; 345/6
See application file for complete search history.

(56) References Cited

U.S. PATENT DOCUMENTS

| | | | | |
|---|---|---|---|---|
| 5,822,117 A | * | 10/1998 | Kleinberger et al. | 359/465 |
| 5,855,425 A | * | 1/1999 | Hamagishi | 353/7 |
| 5,930,037 A | * | 7/1999 | Imai | 359/463 |
| 6,016,159 A | * | 1/2000 | Faris | 348/57 |
| 6,049,424 A | * | 4/2000 | Hamagishi | 359/464 |
| 6,108,029 A | * | 8/2000 | Lo | 348/43 |
| 6,252,707 B1 | * | 6/2001 | Kleinberger et al. | 359/465 |
| 6,985,290 B2 | * | 1/2006 | Putilin et al. | 359/462 |

* cited by examiner

*Primary Examiner*—W. B. Perkey
*Assistant Examiner*—Magda Cruz
(74) *Attorney, Agent, or Firm*—Hogan & Hartson LLP

(57) ABSTRACT

A three-dimensional imaging system and related methods is provided that utilizes a composite transmissive LCD panel. The composite LCD panel contains at least two layers of stacked liquid crystal cells positioned on top of one another relative to the imaging direction, is utilized to display at least two calculated images superimposed over one another at different distances within the panel from the viewer. Each layer of liquid crystal cells create multiple pixels from the cells, which pixels collectively can be operated to form independent images on each liquid crystal layer. The composite LCD panel can be used to create a continuous 3-D image field in a large viewing area or in multiple viewing areas in conjunction with a suitable 3-D image generation system.

32 Claims, 14 Drawing Sheets

COMPOSITE DUAL LCD PANEL DISPLAY SUITABLE FOR THREE DIMENSIONAL IMAGING

CROSS REFERENCE TO RELATED APPLICATIONS

The present Application is a Continuation-in-Part of U.S. patent application Ser. No. 10/751,654, filed Jan. 6, 2004, now U.S. Pat. No. 6,985,290, which in turn is a Continuation-In-Part of U.S. patent application Ser. No. 09/977,462, filed Oct. 15, 2001, now U.S. Pat. No. 6,717,728, which in turn is a Continuation-In-Part of U.S. patent application Ser. No. 09/456,826, filed Dec. 8, 1999 now abandoned, all three of which are incorporated herein by reference in their entirety.

FIELD OF THE INVENTION

This invention relates generally to composite liquid crystal display panel constructions for use in three dimensional displays and other related apparatus. More specifically, the present invention pertains to three-dimensional visualization and multi-viewer and multi-aspect imaging employing such composite liquid crystal display panel constructions and parallel information processing of known images.

BACKGROUND OF THE INVENTION

Objects are seen in three dimensions because light reflects from them and generates a light field in space. The two eyes of a viewer perceive this light field differently due to their different locations in space relative to the object, and the brain of the viewer processes the different perceptions of the light field by the two eyes to generate three-dimensional ("3-D") perception. If a second light field (LF') is artificially recreated that is the same as a first, original light field (LF), the viewer of LF' will see the same object image in three dimensions. The basic quality of any 3-D imaging system therefore depends on the magnitude of the difference between LF and LF', or, in other words, how close the imaging system can come to artificially recreating LF.

U.S. Pat. No. 5,745,197, issued to Leung et al, discloses a "volumetric" display intended to provide a type of 3-D imaging capability. As disclosed therein, the Leung et al. volumetric display creates viewable 3-D images that have real physical height, depth, and width by activating actual light sources at various depths within the volume of the display itself. In this manner, the two eyes of the viewer perceive various image elements at different depths within the volume of the display in perspective, thus creating a 3-D effect. The Leung et al. volumetric display utilizes a physical deconstruction of a 3-D object that entails "slicing" the object into pieces by planes oriented perpendicular to the view path of the viewer. Images corresponding to the resulting slices are then displayed superimposed on a stack of transmissive display screens (corresponding to the perpendicular slicing planes) layered at sequentially increasing distances from the viewer. The volumetric display thereby creates the appearance of a three dimensional image by reproducing individual cross sections of a contoured object on a series of screens wherein images on the screens closer to the viewer are stacked on top of more distant image pieces. Therefore, a three-dimensional effect is created in essentially a mechanical fashion. This type of volumetric display requires the layering of two or more transmissive imaging display panels to create the effect of depth, so its three-dimensional effect is limited necessarily by the depth, number and distance between the various display screens on which the image slices appear. Suitable display panels for this purpose include transmissive liquid crystal display screens.

Stereoscopic imaging is another technique utilized to simulate three-dimensional images to viewers. Stereoscopic displays operate by providing different yet corresponding perspective images of the same object or scene to the left and right eyes of the viewer. The viewer's mind thereby processes these two images to produce a perception of three dimensions. The principles of stereoscopic imaging have been applied to various areas for many years, including to the training of professionals, such as pilots to physicians, and to entertainment, such as 3-D movies and computer games. All stereoscopic systems rely upon one or more certain techniques to segregate images for the right and left eyes. Typically, stereoscopic imaging systems utilize special parallax barrier screens, headgear, or eye wear to insure that the left eye sees only the left eye perspective and the right eye sees only the right eye perspective.

U.S. Pat. No. 6,717,728, issued to Putilin et al. and commonly owned by the assignee of the present invention, discloses an autostereoscopic 3-D display that provides real-time and high resolution 3-D imaging capability without utilizing parallax barriers or specialized headgear. The Putilin et al. display utilizes an image processing algorithm to generate two or more calculated images from base stereopair images, which are the images that one ultimately wants to deliver to the two eyes of the viewer. A first one of those calculated images are sent to a distant display and the other one or more calculated images are sent to one or more transmissive displays placed in front (relative to the viewer position) of the distant display. Each display therefore simultaneously displays the calculated images that each contain at least some of the image information destined for each eye of a viewer. Each display's calculated image, when viewed simultaneously by a viewer, acts as a mask for and combines with the other displayed calculated images, resulting in the two different stereoscopic images being provided to the left and right eyes of the viewer, the stereoscopic effect being caused by the geometry of the spacing of the viewer's eyes and the spacing of the various layered displays. Putilin et al. discloses that the electronic processing to generate the calculated images necessary to deliver each of the base stereopair images to the appropriate eye can be accelerated by an artificial neural network. In one certain embodiments in the patent, multiple transmissive liquid crystal display panels are stacked one behind the other (relative to the viewer) in conjunction with a spatial mask, such as a diffuser, which is placed between liquid crystal displays to suppress Moiré patterns.

The layering of conventional passive or active matrix liquid crystal display ("LCD") screens as utilized in the above patents is not optimal for purposes of 3-D display systems. A liquid crystal display is a thin, lightweight display device with no moving parts. It consists of a grid of pixel elements, with each pixel element including an electrically-controlled light-polarizing liquid trapped in cells between two transparent polarizing sheets. The polarizing axes of the two sheets are typically aligned perpendicular to each other. Each pixel is supplied with electrical contacts that allow an electric field to be applied to the liquid inside the corresponding cell or cells.

Before an electric field is applied, long, thin molecules in the liquid are in a relaxed state. Ridges in the top and bottom sheet encourage polarization of the molecules parallel to the light polarization direction of the sheets. Between the sheets, the polarization of the molecules twists naturally between the two perpendicular extremes. Light is polarized by one sheet, rotated through the smooth twisting of the crystal molecules, and then passes through the second sheet.

When an electric field is applied, the molecules in the liquid align themselves with the field, inhibiting rotation of the polarized light. As the light hits the polarizing sheet perpendicular to the direction of polarization, all the light is absorbed and the cell appears dark. In the relaxed state, however, the whole assembly appears nearly transparent to the eye. Between the two extremes, the cells also can be varied in increments to produce a grayscale effect.

The liquid crystal material used in standard LCD cells rotate all visible wavelengths equally, thus additional elements are utilized in standard LCDs to produce a color display. On common manner of providing a color LCD is to have each pixel is divided into three cells, one with a red filter, one with a green filter and the other with a blue filter. The pixel can be made to appear an arbitrary color by varying the relative brightness of its three colored sections. These color component cells can be arranged in different ways, forming a kind of pixel geometry optimized for the monitor's usage.

In all transmissive LCD panels, a slight darkening will be evident even in the relaxed state because of brightness losses from the backlighting source caused by the various sources, including the polarizing sheet for the backlight, the color filters, and the pixel grid materials. As individual transmissive LCD panels are stacked to produce 3-D displays, such as in the manner utilized in the Putilin et al. or Leung et al. displays, the brightness losses multiply, producing a less vivid and sharp 3-D display providing lower contrast and resolution. It would be desirable to preserve brightness in such 3-D display systems.

With regard to standard two-dimensional LCD panels, several technologies that create a single LCD panel by stacking two or three liquid crystal cells on top of one another have been developed in an attempt to maximize the quality of LCD images while reducing fabrication costs. U.S. Pat. No. 5,539,547, issued to Ishii et al, describes liquid crystal devices of the double-layer super twist nematic ("DSTN") type that utilize plural polymer films. The DSTN type of LCD panel utilizes two transmissive passive-matrix LCD cells layered on top of one another to counteract the color shifting that occurs with conventional super twist passive matrix displays. Such DSTN displays are intended to be a more affordable and lower power-consumption alternative to thin film transistor ("TFT") active-matrix LCD panels, but DSTN displays produce a lower quality picture than TFT displays. DSTN displays have double the response time (i.e., the lag time in forming screen graphics) of TFT displays, and typically only half the viewing angle capability. Contrast ratio (or picture sharpness) for DSTN displays also typically is significantly lower than for TFT displays, thus making DSTN displays generally undesirable for high quality graphic applications.

Phase change guest-host display ("PC-GHD") screens provide an alternative to color filters for use in making full color LCD displays. Instead of providing color by incorporating three side-by-side cells and a color filter of three different colors for each individual pixel, PC-GHD screens layer three liquid crystal cells on top of one another for each pixel. Each of the three cells in the pixel has a different pigment added to its liquid crystal, and each cell can be varied in coordination with the other two cells from fully transmissive to fully blocking to produce any single color for the pixel. PC-GHD screens eliminate the color grid contained in standard TFT display panels, but PC-GHD screens are also largely undesirable for high quality graphics production as they currently provide lower contrast than TFT displays.

In light of the prior art in the field of 3-D imaging and transmissive display technology, it would be desirable to have a 3-D imaging system that provides high quality imaging of numerous aspects, perspectives or views to a given single user or multiple users in a dynamic manner. Such viewing optimally should take place in a flexible way so that the viewer is not constrained in terms of the location of the viewer's head when seeing the stereo image, and should provide a maximum of contrast and brightness to the viewer.

SUMMARY OF THE INVENTION

In light of the above drawbacks in the prior art, it is an object of the present invention to provide for multi aspect image viewing and the creation of dynamic and high quality 3-D image effects viewable by one or more viewers.

It is further an object of the present invention to be able to present an unlimited number of aspects of an image to a viewer so as to approximate a full 3-D viewing experience without losing any image information, brightness or quality.

It is another object of the present invention to provide the ability to generate and display 3-D images in a dynamic manner suitable for interactive and real-time applications by removing sources of error and distortion from the generating and viewing of stereoscopic images.

Additionally, it is an object of the present invention to provide systems and related methods for 3-D imaging that improve 3-D image quality and maximize image information to the viewer. Thus, the present invention eliminates unnecessary masks and unnecessary obstructions from the image path of viewers when reviewing stereo imagery, and eliminates the need for specialized viewing gear or parallax barriers or lenticular screens within the view path of viewers trying to visualize a 3-D scene or object.

The present invention provides a system and related methods for three-dimensional visualization based upon stereoscopic imaging and parallel information processing of source stereo and multi aspect images. The source images can be processed for a single 3-D viewing zone or multiple 3-D viewing zones for multiple users. Preferably, the processing according to embodiments of the present invention is adaptive in nature so as to be continually re-processed as the location of a given viewer or viewers change. Thus the perception of 3-D images by any given viewer is improved by not constraining the viewer in any meaningful way.

In embodiments of the present invention, a composite transmissive LCD panel, consisting of at least two layers of stacked liquid crystal cells positioned on top of one another relative to the imaging direction, is utilized to display at least two calculated images superimposed over one another at different distances within the panel from the viewer. Each layer of liquid crystal cells create multiple pixels from the cells, which pixels collectively can be operated to form an image on the liquid crystal layer. An illumination source is positioned behind the two layers of the composite panel to illuminate images created on the layers.

Each liquid crystal cell layer in the composite panel of the present invention displays a calculated image that is not one of the source stereopair images that ultimately need to be conveyed to the two eyes of the viewer to produce a desired 3-D effect. Rather, the calculated images are derivatives of the source stereopair images that interact optically in the present design to produce collectively the stereo perspective images to be viewed. Source image information is derived from a database of stereopairs stored in a memory unit, or from other suitable sources of base images. A memory unit provides a desired stereopair to a processor, which in turn processes the calculated images to be displayed by the liquid crystal cell layers and controls the layers accordingly. Further, the processor controls the illumination source, such as a lamp or other suitable lighting unit, that backlights the transmissive composite LCD panel in order to enable viewing of the images produced on the liquid crystal cell layers.

To calculate the derivative images for each liquid crystal cell layer, the processor estimates the light directed to each one of a viewer's eyes by calculating interim calculated images for each of said transmissive cell layers, and then determines the light directed through each discrete pixel of the front cell layer of the transmissive composite LCD panel. The processor then compares the estimated light for each pixel with the equivalent light from the selected ones of the original source stereopair images to determine an error, and then adjusts the interim calculated images as appropriate to reduce the error in order to keep the error for each pixel is below a set limit. Preferably, the calculation of and refining of the derivative images is performed by an artificial neural network.

In embodiments of the invention, the calculated image displayed by each liquid crystal cell layer acts as a dynamic mask for the image(s) of the other layer(s). Thus, the viewer sees no objects or obstructions other than the 3-D image itself, in contrast to conventional parallax barrier-type imaging systems, where a physical barrier mask can clearly be seen. Such generating of the 3-D image results in the absence of noise and distortion of a visual nature such as that created by lenticular screens or lenses.

According to embodiments of the present invention, since the 3-D image information is distributed between the two or more liquid crystal cell layers, there is no loss of resolution as produced in prior art systems where image information for both eyes is displayed on a single screen or plane behind a resolution-limiting barrier, such as a parallax barrier, lenticular screen or lens. Further, a composite transmissive LCD panel containing integrated multiple liquid crystal cell layers removes unnecessary elements normally present in standard LCD panels that would otherwise introduce losses in image brightness and cause imaging distortions.

In certain embodiments of the invention, the calculated images are presented to one or more viewers based upon a sensing of one ore more viewer's positions. This viewer position signal is generated and sent to the processor by means known in the art, such as by an infrared ("IR") position sensor or radio frequency ("RF") or ultrasonic position tracking sensor, where the processor then in turn retrieves an appropriate image stereopair from the image source for subsequent processing, presentation, and display by the controller of the composite transmissive LCD panel. Further, in preferred embodiments of the invention, viewer position sensors are utilized to present a viewer with different aspects of an image as their viewing position changes so as to allow the viewer to view various perspectives of an image in dynamic fashion. The present invention thereby is capable of creating a continuous 3-D image field in a large viewing area with improved image quality, as opposed to a discrete, stationary set of stereo viewing zones where the image quality greatly deteriorates as the number of viewing zones increases.

In other embodiments of the invention, a multi-user and multi-view display capability is provided. In this manner, different members of a viewing group each cab be provided with different aspects of the same image, or different images altogether, based on any number of factors such as, but not limited to viewing location or angle. Both three-dimensional and two-dimensional imaging for each viewer can be provided.

The embodiments of the invention having been thus described, discussion will now be provided of preferred embodiments of the invention as depicted in the drawings.

BRIEF DESCRIPTION OF THE DRAWINGS

The accompanying drawings, which are included to provide further understanding of the invention and are incorporated in and constitute part of this specification, illustrate embodiments of the invention and together with the description serve to explain the principles of the invention. In the drawings.

DETAILED DESCRIPTION OF THE PREFERRED EMBODIMENTS

Figure 1:
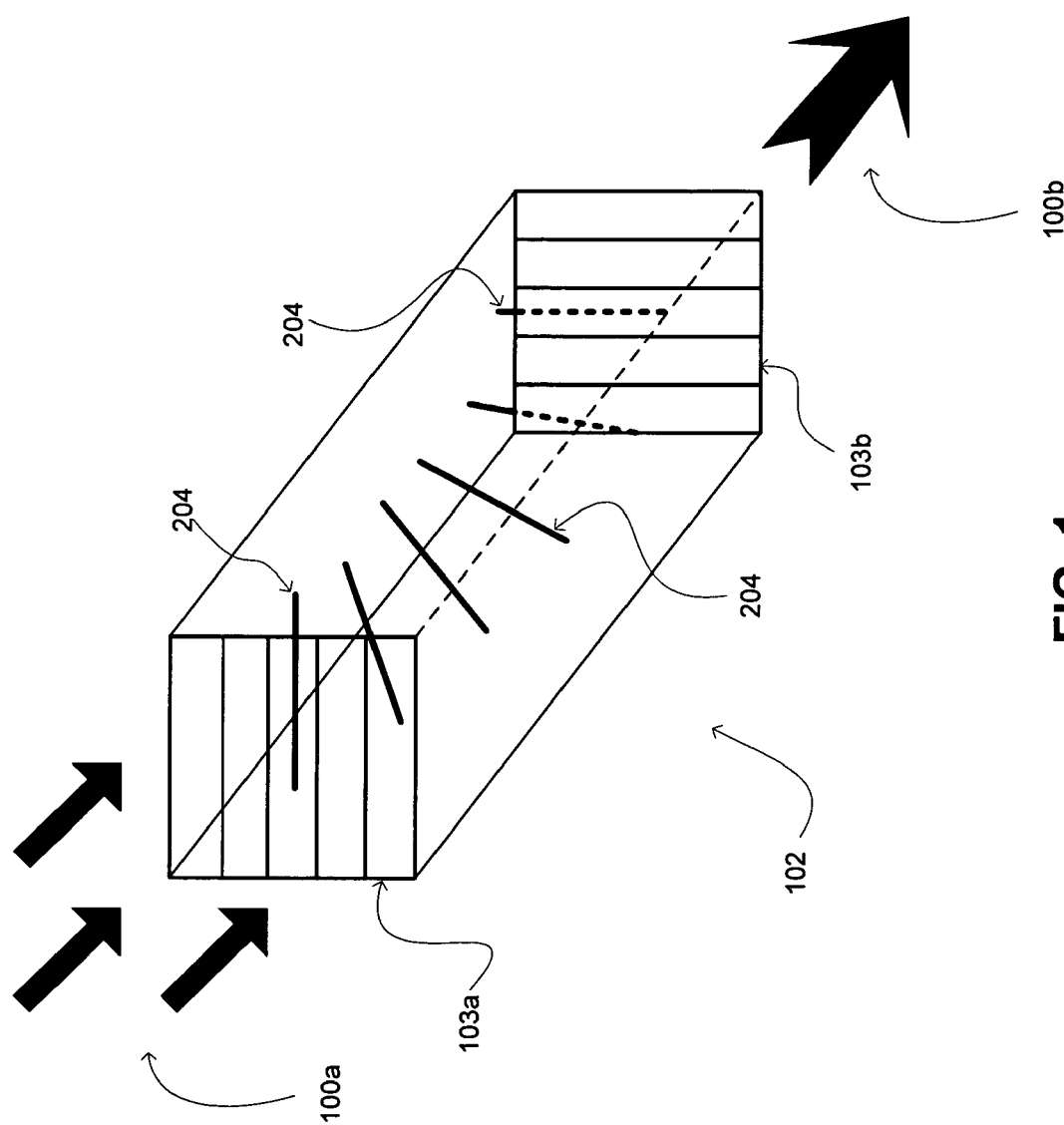
FIG. 1 is a schematic diagram illustrating a common liquid crystal cell.

FIG. 1 illustrates a common liquid crystal cell 102. Many of such cells are utilized to create pixels in the liquid crystal cell layers of LCD panels. Each such cell 102 contains liquid crystal material trapped within an enclosure. Liquid crystals are a class of long, thread-like molecules that under certain conditions exhibit isotropic fluid-like behavior, including the ability to flow, but that also can adopt structures having higher ordering than found in other fluids. The ordering of liquid crystal materials is extensive on the molecular scale, but does not extend to the macroscopic scale as might be found in classical crystalline solids. In this manner, structural ordering in a liquid crystal material might extend along one direction, but the material along another direction might exhibit significant disorder. The liquid crystal material contained within cell 102 contains many liquid crystal molecules forming dipoles 104 trapped between two substantially transparent opposing orientation surfaces, including an input orientation surface 103a and an output orientation surface 103b.

Each of the orientation surfaces have an orientation feature whereby, as result of mechanical processing of their surfaces during fabrication, the surfaces have micro-ripples oriented in a single direction and facing the liquid crystal material. These micro-ripples interact with the liquid crystal dipoles 104 near the surface in a manner that causes those dipoles near the surface to generally orient in a direction parallel to the micro-ripples as depicted in FIG. 1.

In common liquid crystal cells 102 as depicted in FIG. 1, micro-ripples in the surface of the input orientation layer 103a are oriented perpendicular with respect to the to the micro-ripples of the output orientation layer 103b. Thus, dipoles 104 naturally align in a spiral-like structure within the cell 102 stretching between the orientation layers 103a and 103b. Liquid crystal material aligned in this spiral-like structure has the optic properties of rotating the polarization of light along with the bending of the dipoles such that the polarization of light 100a entering the cell 102 is naturally rotated by 90 degrees to produce orthogonally polarized light 100b exiting the cell. In the presence of electric field, however, dipole molecules within a given cell can be made to align with the electrical field. In this manner, the polarization of the input light can be controlled by passing it through a liquid crystal cell in the presence of a controllable electrical field.

Figure 2:
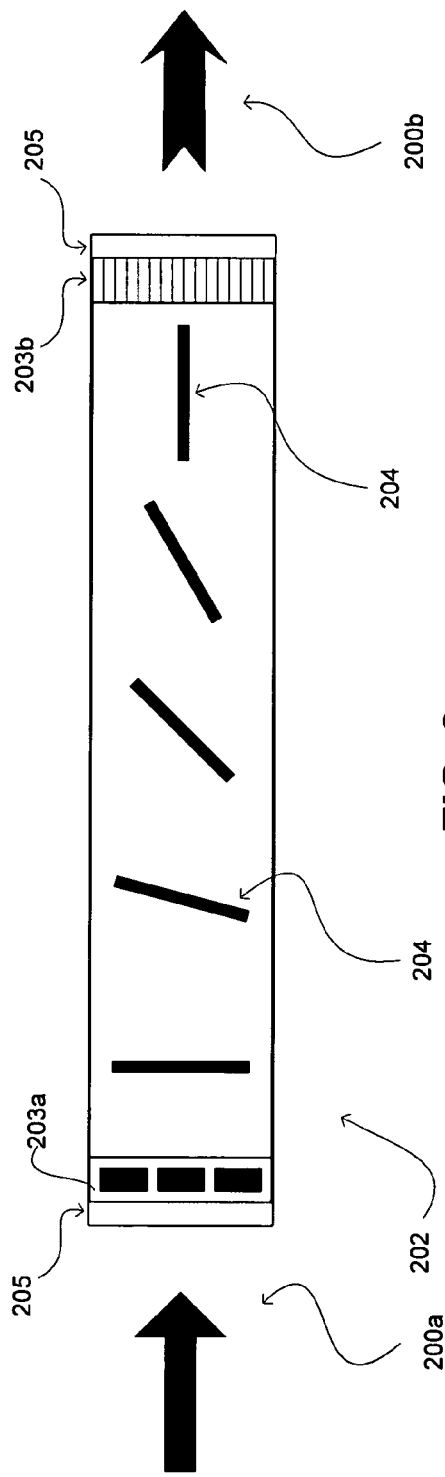
FIG. 2 is a schematic diagram illustrating the operation of a liquid crystal cell in a relaxed state.

Turning now to FIG. 2, there is depicted in cross section a typical liquid crystal display cell 202 in a "relaxed" state whereby the dipoles orient themselves in a spiral-like pattern in between the input orientation layer 203a and the output orientation layer 203b. At either end on the outside of the cell a thin transmission conductive electrodes layer 205 covers the outside of the orientation surfaces. Indium tin oxide ("ITO") is the material commonly used to make the transparent conductive coatings for the orientation surface of electronic displays cells. ITO is a mixture of indium(III) oxide ($In_2O_3$) and tin(IV) oxide ($SnO_2$), typically in the proportions of about 90% $In_2O_3$ and 10% $SnO_2$ by weight. These electrodes layers can be utilized to apply a controllable electric field to the liquid crystal material.

Figure 3:
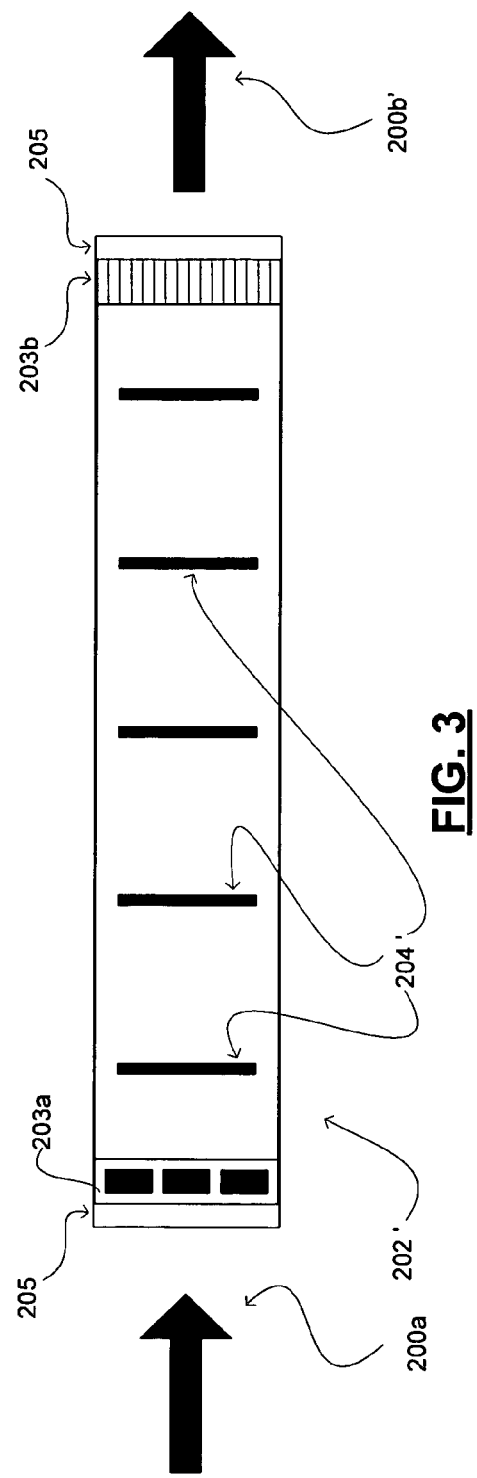
FIG. 3 is a schematic diagram illustrating the operation of a liquid crystal cell in a charged state.

As illustrated in FIG. 2, liquid crystal cell 202 takes input light 200a and passes it through the substantially transparent liquid crystal material trapped between the orientation layers 203a and 203b where it exits the cell 202 as output light 200b having a polarization orthogonal to the input light 200a. FIG. 3 shows a liquid crystal cell 202' in a "charged" state, where an electrical field is being applied to the electrodes layers 205. As shown in this illustration, the dipoles 204' take an orientation in line with the electrical field, causing the output light 200b' to have a different polarization orientation (such as the same orientation as the input light 200a as depicted).

Figure 4:
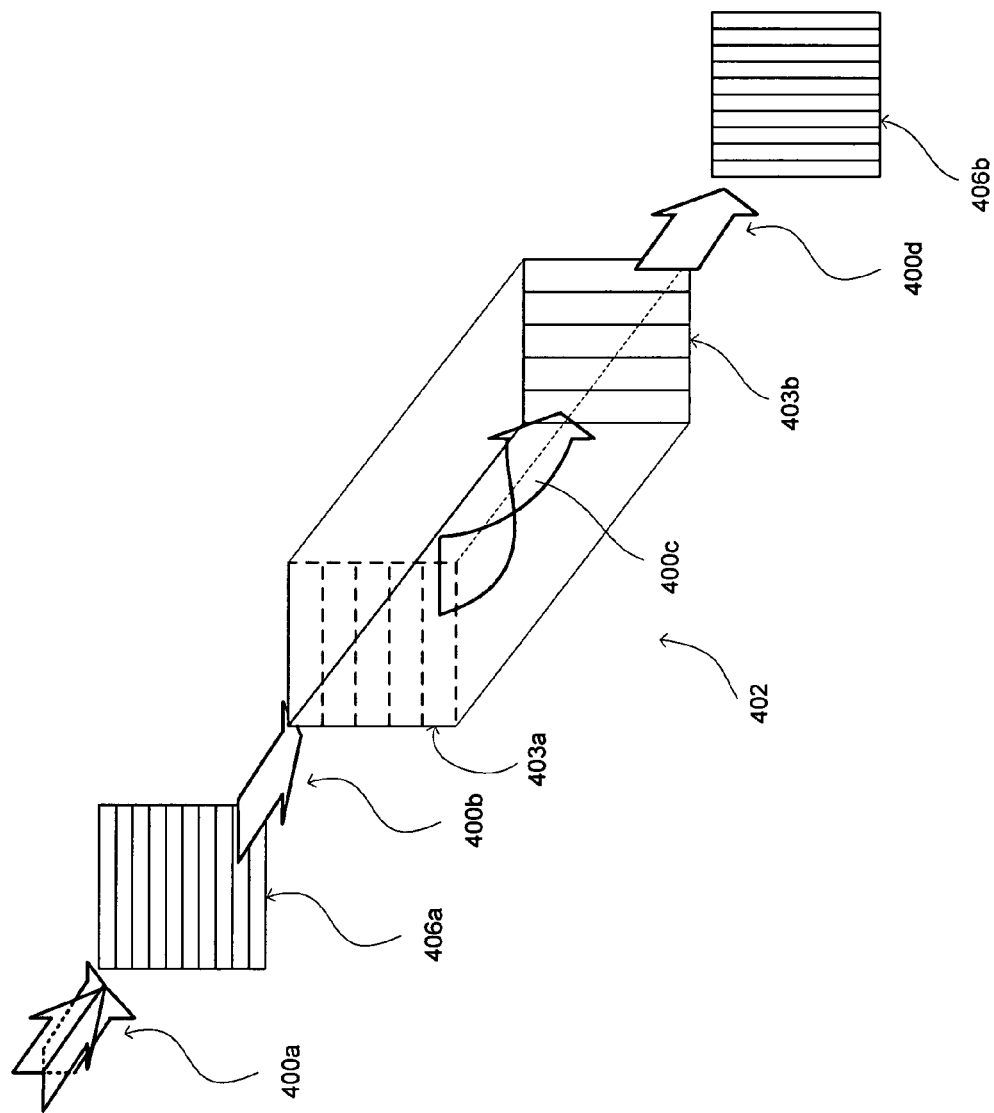
FIG. 4 is a schematic diagram illustrating the transmission of light through a liquid crystal cell and polarizer sheets.

In commercial LCD applications, a layer of individual liquid crystal cells, as depicted in FIG. 1 through FIG. 3, is typically placed between two polarizer sheets. FIG. 4 illustrates the transmission of light through a liquid crystal cell 402 operating in a relaxed state where the cell 402 is oriented between two polarizer sheets 406a and 406b. As shown, input polarizer sheet 406a has an polarization orientation aligned with the orientation of the micro-ripples of input orientation surface 403a, and output polarizer sheet 406b likewise has an polarization orientation aligned with the orientation of the micro-ripples of output orientation surface 403b. Thus, polarizer sheets 406a and 406b are oriented orthogonal to one another.

With this structure, incoherent (unpolarized) light 400a from a back lighting source would pass through the input polarizer sheet 406a and lose the vertical polarized component of the incoherent light to produce polarized light 400b. With liquid crystal cell 402 in the relaxed state with no voltage in the electrodes (not depicted in FIG. 4), the polarized light 400b would enter through the transparent input orientation surface 403a and travel through the liquid crystal material. Since the dipoles (not depicted in FIG. 4) are in the relaxed state, the liquid crystal material naturally rotates polarization of light 400c within the cell 402 by 90 degrees. Polarized light 400d exiting the cell 402 now has a polarization orientation orthogonal to the originally polarized light 400b. This light is thus able to pass through the exit polarization sheet 406b to an observer, making the cell 402 in a relaxed state appear substantially transparent and bright to the eye. If an electrical field was applied to the cell 402, the input polarized light 400b could be allowed to largely pass through the liquid crystal material without having its polarization orientation altered, thus making output light largely unable to pass through the output polarizer sheet 406b. Cell 402 in a charged state would therefore appear substantially opaque and dark to the eye as very little light would reach the viewer.

Figure 5:
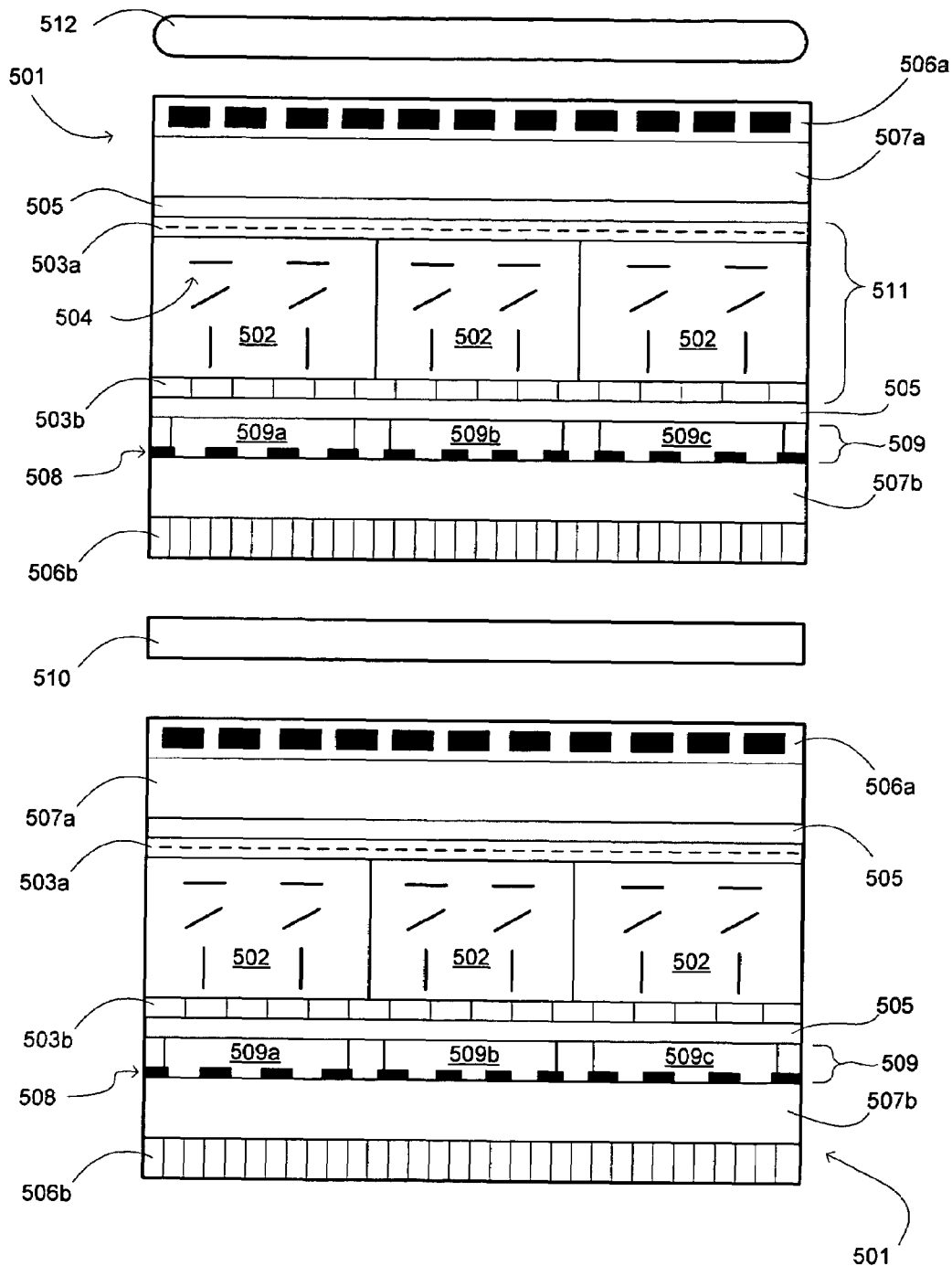
FIG. 5 is a schematic diagram illustrating the stacking of common LCD panels in accordance with an autostereoscopic 3-D display system.

FIG. 5 is a schematic diagram illustrating the stacking of common transmissive liquid crystal display panels 501 as would be done in the prior art in accordance with an autostereoscopic 3-D display system. As shown in FIG. 5, common LCD panels 501 (shown in cross section magnified to the pixel-size level) each contain one liquid crystal cell layer 511 trapped between sheets of electrical conducting material 505, such as ITO. The cell layer 511 includes various individual liquid crystal cells 502 encasing liquid crystal material 504. The cells 502 in the layer 511 share a common input orientation layer 503a and an output orientation layer 503b having the orientation surface properties generally as described above.

The transmissive LCD panel 501 further includes an input polarizer sheet 506a and an output polarizer sheet 506b, again arranged with their relative polarization orientations to match the corresponding orientation surfaces 503a and 503b and being orthogonal to one another as described above. A thin sheet of an optically transparent material 507*a*, such as glass, separates the input polarizer sheet 506*a* from the electrode layer 505 on top of the input orientation layer 503*a*. A second thin sheet of an optically transparent material 507*b* separates output polarizer sheet 506*b* from components of the LCD panel that enable color control, including a color filter assembly 509, and a black grid 508 (typically having an aperture is in the range of about 40-90%) that provides increased contrast. In a typical color LCD panel, each pixel is composed of three cell sections defined by the color filter assembly 509, one with a red color filter 509*a*, one with a green color filter 509*b*, and the other with a blue color filter 509*c*, as depicted. The pixel can be made to appear an arbitrary color by individually varying the relative brightness of each its three colored sections.

When two transmissive LCD panels 501 are used in stacked configuration for an autostereoscopic 3-D display system as depicted in FIG. 5 and described in detail in prior U.S. Pat. No. 6,717,728 and U.S. patent application Ser. No. 0/751,654, filed Jan. 6, 2004, light transmission losses can become problematic. Light from a back light device 512 is polarized by the input polarizer sheet 506*a* of a first LCD panel 501 (i.e., the panel closest to the back light device 512), passes through the optically transparent material 507*a*, and then passes through liquid crystal cells 502. Depending upon the voltage applied to the electrode layers 505, the liquid crystal aligns in an orientation to produce a desired polarization rotation of the input light. This, in turn, defines the level of intensity of light exiting the output polarizer sheet 506*b*. RGB coloring is provided by the color filter assembly 509 and black grid 508 provides increased contrast.

Any polarized light that exits output polarized sheet 506*b* of the first LCD panel would then pass through a diffuser or other like device 510 that is able to rotate the polarization of the light to match the input orientation of the next LCD panel, and then pass through a second LCD panel (displaying a different image than the first LCD panel) before reaching the user. Optionally, the LCD panels could alternatively be arranged such that a device 510 is not necessary, whereby the output polarization of the back LCD panel matches the input polarization of the front LCD panel. Nevertheless, any brightness losses caused by the first transmissive LCD panel are duplicated and exacerbated by the second and any subsequent LCD panels. Table i shows typical values of light transmission levels for particular ones of the various LCD panel elements discussed above.

TABLE i

| Layer | Transmitted light energy, % | Absorbed light energy, % |
| --- | --- | --- |
| Input polarizer | 43 | 57 |
| Liquid crystal (relaxed) | 95 | 5 |
| Color filter | 25 | 75 |
| Black grid | 80 | 20 |
| Output polarizer | 80 | 20 |
| TOTAL: | 6.5 | 93.5 |

Notably, Table i indicates that approximately less than 7% of the illuminating light from a back lighting source reaches observer's eyes in the case of a single transmissive LCD panel. The addition of a second LCD panel between the first LCD panel and the viewer would decrease transmitted light to under 0.5% (even without a diffuser placed between the LCD panels), and subsequent LCD panels would contribute further degradation of output brightness and quality.

Figure 6:
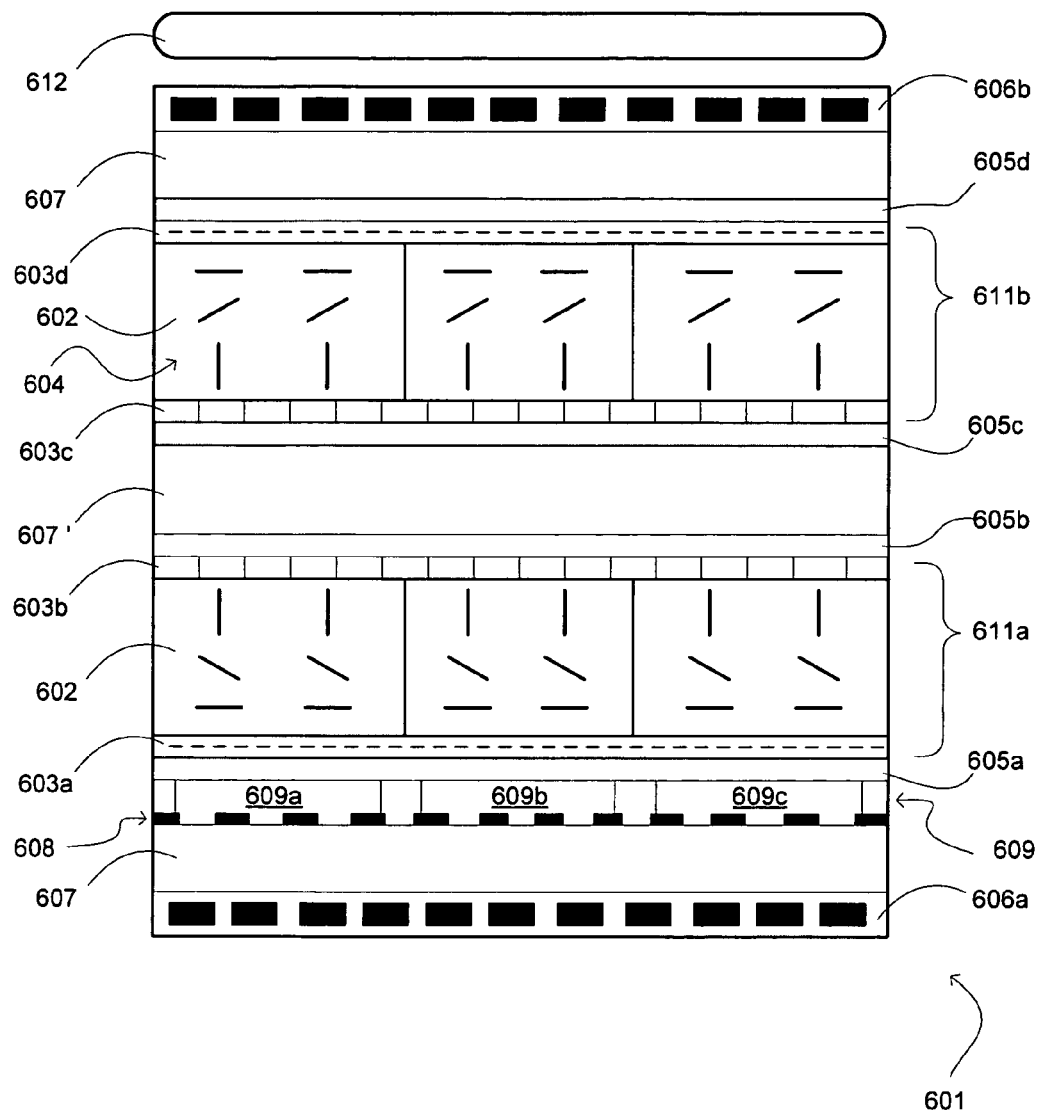
FIG. 6 is a schematic diagram illustrating a composite transmissive liquid crystal display panel for use within a 3-D imaging system according to embodiments of the present invention.

To combat the problems attendant in the stacking of common transmissive LCD panels in an autostereoscopic imaging system, the present invention as depicted in FIG. 6 provides a composite transmissive LCD panel 601 (shown in cross section at the pixel level), consisting of at least two layers 611*a* and 611*b* of stacked liquid crystal cells 602 positioned one after the other along an imaging direction. Each layer 611*a* and 611*b* of liquid crystal cells 602 create multiple pixels, where the pixels of a given layer 611*a* or 611*b* collectively can be operated to form an image on that layer. The cells in each layer are controlled such that each layer individually and simultaneously displays one of at least two calculated images (one different calculated image for each layer) in a manner whereby the calculated images are superimposed over one another at different distances within the composite LCD panel 601 relative to the viewer location. An illumination source 612 is positioned behind the composite LCD panel 602, and thus behind the two layers 611*a* and 611*b*, to illuminate the calculated images created on the layers. Similar to liquid crystal layers present in prior art transmissive LCD panels, liquid crystal layers 611*a* and 611*b* include various individual liquid crystal cells 602 encasing liquid crystal material 604 in the manner described generally above. The cells 602 of each layer 611*a* or 611*b* share common input orientation layers 603*a* or 603*c* and output orientation layers 603*b* or 603*d* having the orientation surface properties and orthogonal orientations generally as described above. Each layer 611*a* or 611*b* is encased between sheets of electrical conducting material 605*a* and 605*b*, and 605*c* and 605*d*, respectively, which are adapted to apply a controllable electrical field to the enclosed cells 602.

This composite LCD panel 602 as depicted also consists of an input polarizer sheet 606*a* and an output polarizer sheet 606*b*, one color filter assembly 609 (containing red, green, and blue color filter elements 609*a-c*), and one black grid 608. Two layers 607 of optically transparent material, such as glass, are placed adjacent to the polarizer sheets 606*a* and 606*b* as depicted to insulate and protect the liquid crystal layers 611*a* and 611*b* and to space the layers from the polarizer sheets 606*a* and 606*b*. An additional layer 607' of optically transparent material, such as glass, is situated between the first liquid crystal layer 611*a* and the second liquid crystal layer 611*b* binding them together. This layer 607' has a thickness that is sufficient to insulate the liquid crystal layers 611*a* and 611*b* from one another and to create geometry suitable for a stereo effect, as described below.

In order for the two liquid crystal layers 611*a* and 611*b* to work in conjunction, the output orientation layer 603*b* for the first liquid crystal layer 611*a* must be aligned along the same polarization direction with the input orientation layer 603*c* of the second liquid crystal layer 611*b*, as depicted. Additionally, polarizer sheets 606*a* and 606*b* have parallel (as opposed to orthogonal) polarizing orientations (assuming the characteristic "twist" of each layer 611*a* and 611*b* is 90 degrees, as depicted). Alternatively, of course, optically transparent material layer 607' can be incorporated with a feature to change polarization of transmitted light by 90 degrees (or an otherwise appropriate amount) if the orientation of sheets 606*a* and 606*b* and orientation layers 603*b* and 603*c* are not matched as depicted.

While similar LCD panel structures incorporating two or more liquid crystal layers within a single panel have been proposed for use as DSTN and PC-GHD liquid crystal displays, the composite structure according to the present invention as depicted in FIG. 6 and described herein has not been employed in high resolution 3-D imaging systems as herein described. Employing the composite transmissive LCD panel according to the present invention in 3-D display systems has the advantages over stacked standard LCD panels of losing virtually no brightness and providing better image clarity. While a standard transmissive LCD has about a 6.5% transmission rate, the composite transmissive LCD according to the present invention provides a comparable transmission rate of approximately 6.2%. The effect of adding a third and subsequent liquid crystal cell layers into the composite LCD panel is likewise minimal.

Additionally, composite transmissive LCD panels according to the present invention produce virtually no appreciable Moire effect without requiring the presence of a diffusing material between the liquid crystal layers. In the place of the diffuser, the glass or other transparent material in between the liquid crystal layers provides a hard structure and equal illumination across the whole imaging area of the panel.

The principles of the composite transmissive LCD panel according to embodiments of the present invention having been thus described, description will now be provided with respect to an autostereoscopic imaging system and related methods for use with which the composite LCD panel is particularly suitable. The autostereoscopic imaging system, as is described in detail in prior U.S. Pat. No. 6,717,728 and U.S. patent application Ser. No. 0/751,654, filed Jan. 6, 2004, creates a three-dimensional viewing experience by using multiple stacked electronic transmissive displays, such as liquid crystal panels. Instead of stacking separate LCD panels, the composite LCD panel of the present invention can be employed as described hereafter. The 3-D imaging system provided would therefore have increased brightness and image quality for viewing within large and continuous viewing zones where the 3-D images can be created dynamically on the composite LCD panel.

Figure 7:
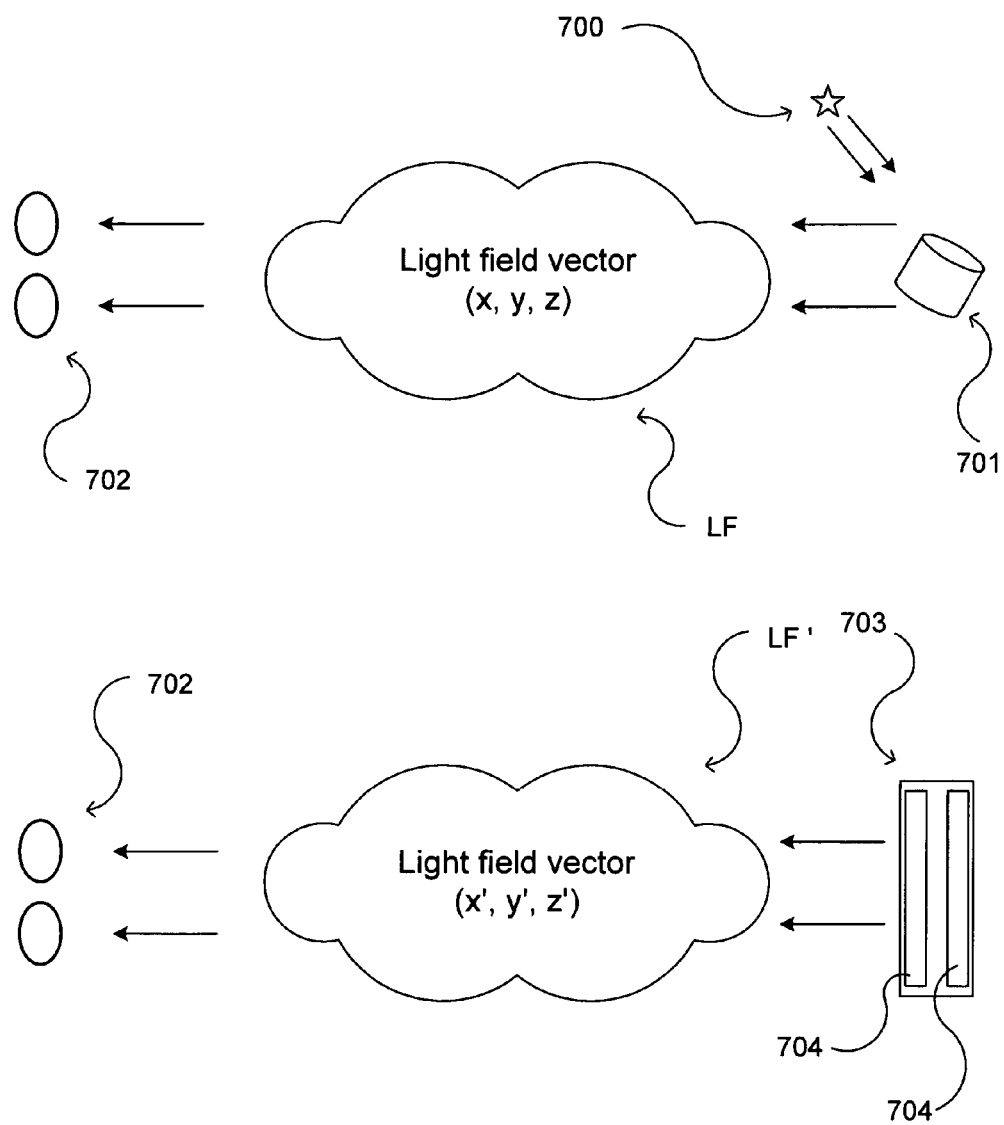
FIG. 7 is a schematic diagram illustrating 3-D light fields created by a real object and illustrating the recreation of such light fields utilizing a composite transmissive LCD panel according to the present invention.

FIG. 7 illustrates how humans can see real objects in three dimensions as light 700 reflects from an object 701 and generates a light field LF in space. The two eyes 702 of a viewer perceive this light field differently due to each eye's different location in space relative to the object, and the brain of the viewer processes the different perceptions of the light field by the two eyes to generate three-dimensional perception. FIG. 7 also shows a second light field LF' being formed from the liquid crystal cell layers 704 within a composite LCD panel 703 controlled by a 3-D display system whereby LF' is nearly identical to LF and creates a second perceived 3-D image. The basic quality of any three-dimensional imaging system depends on the magnitude of the difference between LF and LF', i.e., how close the imaging system can come to recreating LF. If the second light field LF' is recreated to be nearly the same as the original light field LF, the viewer of LF' will perceive the same object image in three dimensions.

Figure 8:
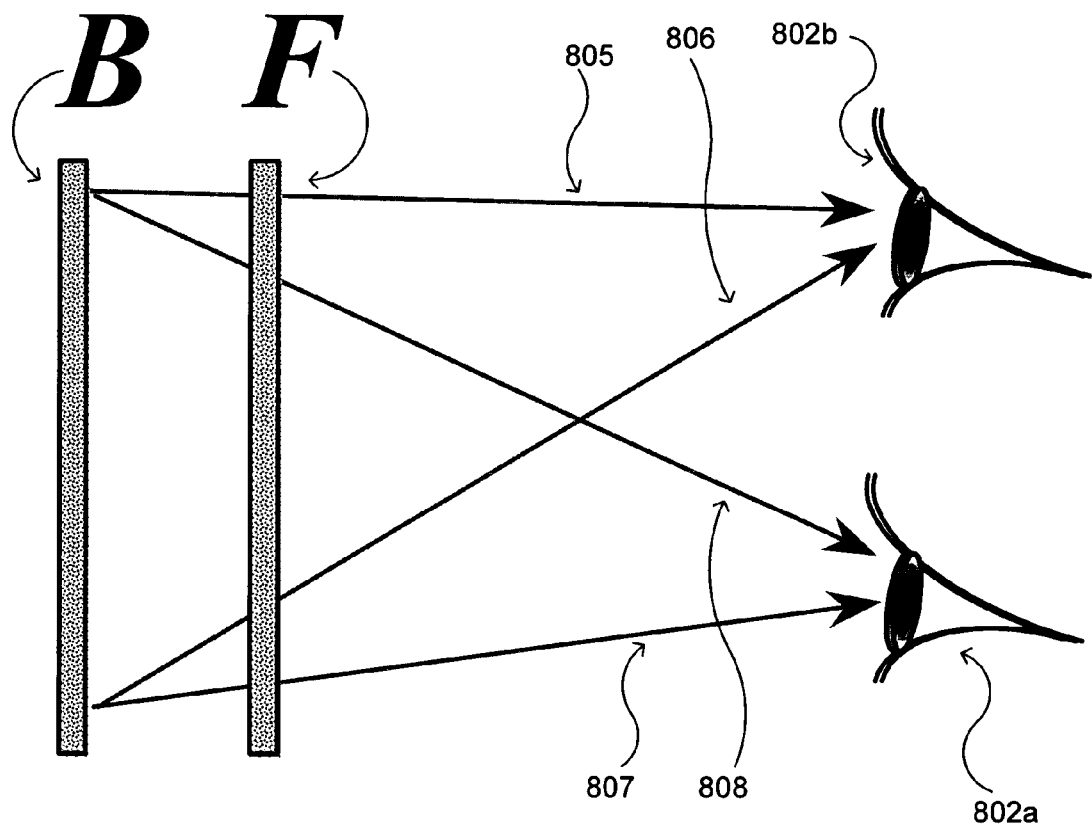
FIG. 8 is a schematic diagram depicting the orientation of a viewer with respect to two stacked liquid crystal cell layers in order to generate 3-D images from layered images.

A preferred 3-D imaging system utilizes two or more stacked transmissive liquid crystal cell layers 704 within a composite LCD panel 703 as shown in FIG. 7, but with each layer cooperating to display derivative images of the stereopair images that are desired to be displayed to the viewer's two eyes. The derivative images interact and effectively mask one another to produce collectively the stereo image to be viewed. As shown in FIG. 8, the composite LCD panel in embodiments of the present invention provides liquid crystal cell layers stacked in an orientation relative to the viewer (viewer position denoted in FIG. 8 by the left and right eye 802a and 802b, respectively). As depicted in the drawing, each eye 802a and 802b has a different view path to the back B and front F cell layers (as shown by view lines 805-808), which view path causes the images on the panels to be summed together and perceived by the viewer as different stereoscopic images for the eyes 802a and 802b.

Figure 9:
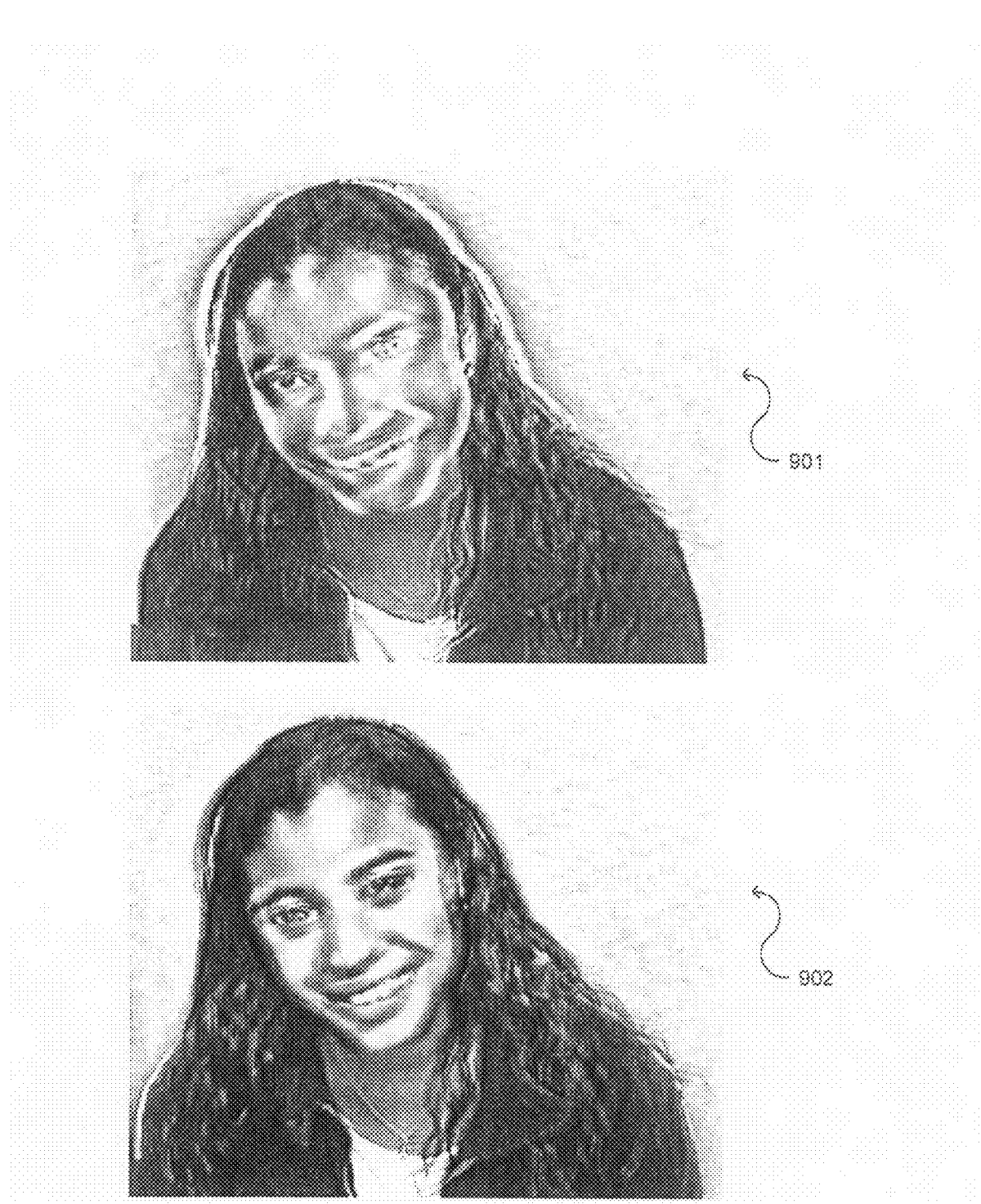
FIG. 9 is an illustration of exemplary calculated images that could be displayed on the liquid crystal cell layers of FIG. 6 to generate 3-D images.
Figure 10:
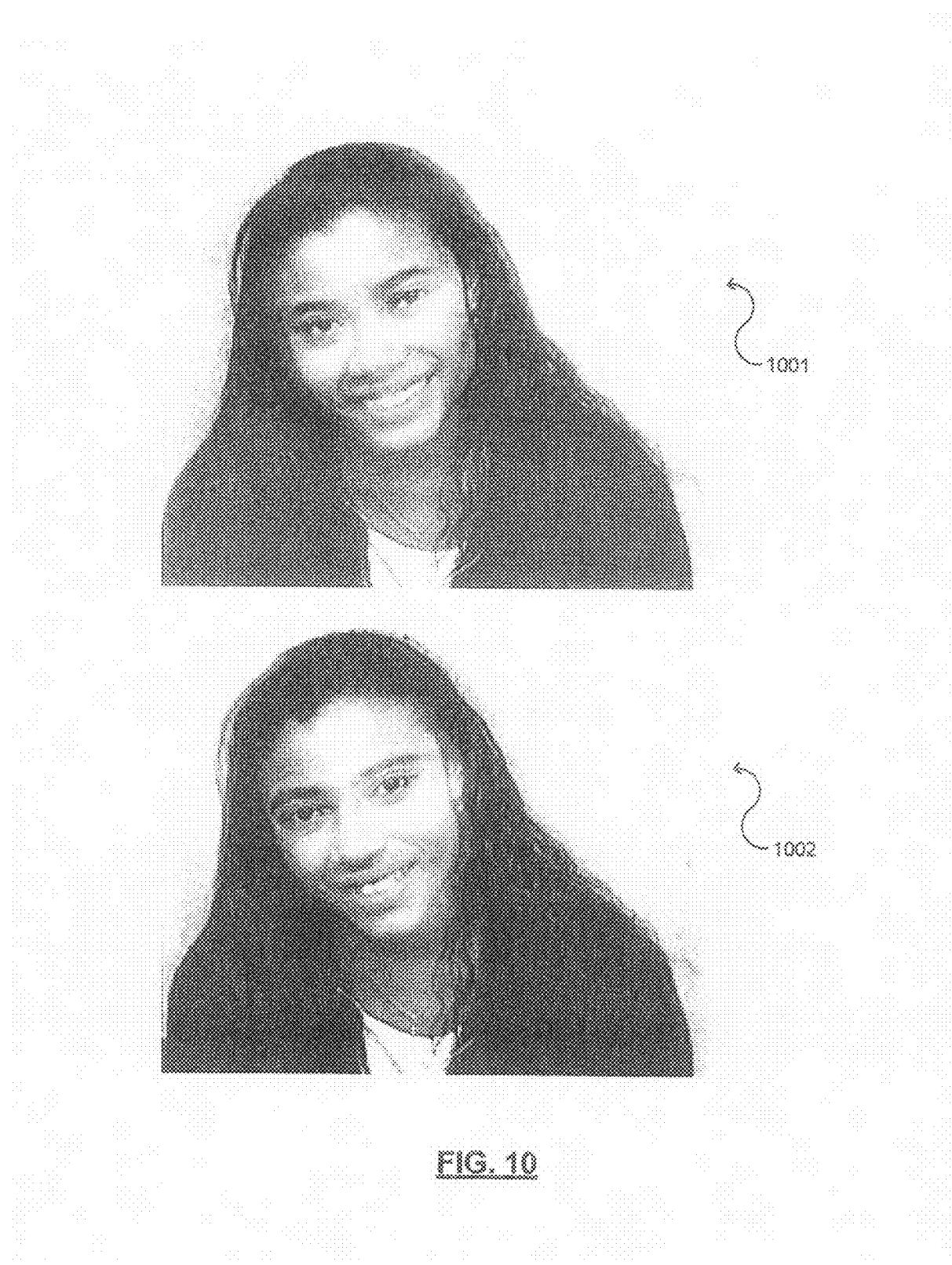
FIG. 10 is an illustration of exemplary perceived 3-D images that could be seen by a viewer when the images of FIG. 9 are displayed on the composite LCD panel of FIG. 8.

FIG. 9 illustrates an example of such derivative images 901 and 902 adapted for the back cell layer B and front cell layer F, respectively. As depicted in the drawing, the derivative images displayed on each of the layers can appear blurred and chaotic when viewed independently and separately. However, when viewed simultaneously with the cell layers B and F in the proper orientation within the composite LCD panel 801 as depicted in FIG. 8, the derivative images will produce appropriate stereoscopic images 1001 and 1002 that reach the left and right eyes of the viewer, respectively, as depicted in FIG. 10.

To calculate the derivative images for each cell layer in embodiments of the invention, the processor estimates the light directed to each one of a viewer's eyes by calculating interim calculated images for each cell layer, and then determines the light directed through each discrete pixel of the front cell layer as a result of the images created simultaneously on both layers. The processor then compares the estimated light for each pixel with the equivalent light from the selected ones of the original source stereopair images to determine an error, and then adjusts the interim calculated images as appropriate to reduce the error in order to keep the error for each pixel below a set limit.

In accordance with an embodiment of the invention, an iterative algorithm evaluates the differences between the generated images and the original image. Based on the differences between them, the algorithm dictates screen imaging adjustments. These screen adjustments cause changes to the generated images making them more identical replicas of the original (i.e. approaching maximum exactness). For example, this iterative process can require several iterations, such as 3 to 7 iterations, to render each frame within acceptable error.

Figure 11:
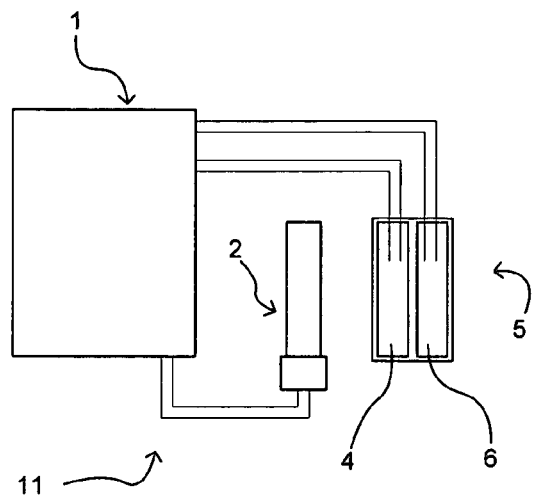
FIG. 11 is a schematic diagram illustrating components of an autostereoscopic 3-D display system utilizing a composite LCD panel in accordance with an embodiment of the present invention.

FIG. 11 shows the basic components of a display system 11 in accordance with a preferred embodiment of the invention. In the drawing, a distant and nearest (hereinafter also called "near") liquid crystal cell layers 4 and 6 are separated by a known gap within a composite LCD panel 5. The liquid crystal cell layers within the composite LCD panel are controlled by a computing device 1, such as a personal computer, a video controller, or other suitable digital processing device. As will be discussed in detail below, the display system depicted relies on the calculation of images by the computing device 1 that are then displayed on the distant and near liquid crystal cell layers 4 and 6 to produced perceived stereo images in the viewer eyes. The computing device 1 also controls a lighting source 2 adapted to backlight the composite LCD panel 5.

Figure 12:
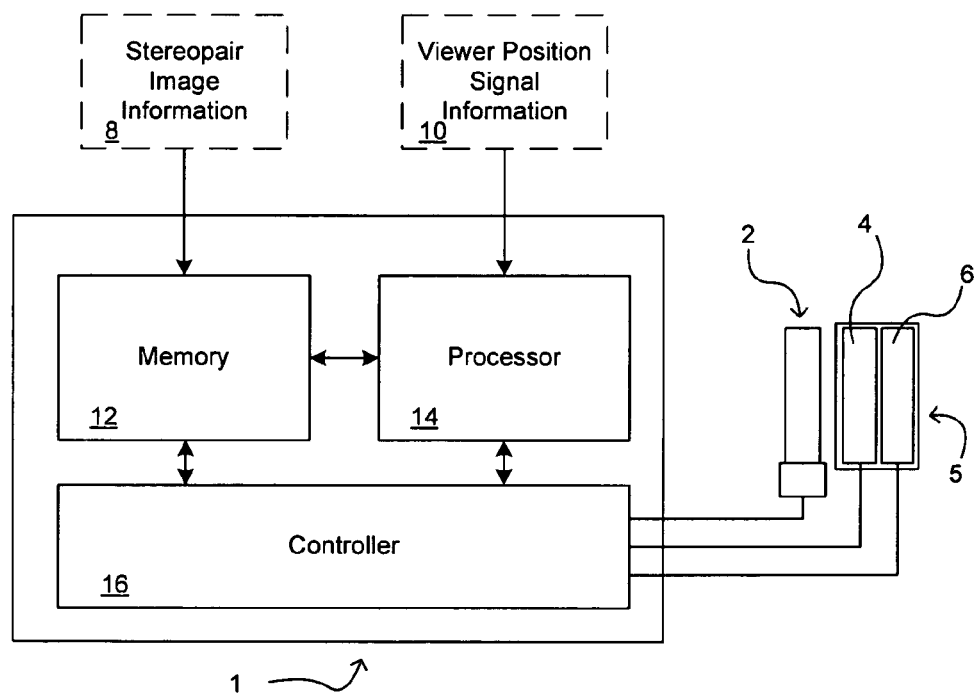
FIG. 12 is a schematic diagram illustrating a computational and control architecture utilized to generate 3-D images for an autostereoscopic 3-D display system utilizing a composite LCD panel in accordance with an embodiment of the invention.

FIG. 12 illustrates the detail for the computing device 1, depicting the computational and control architecture utilized to generate 3-D images in accordance with that embodiment of the invention. Although disclosed in this embodiment as including a viewer position signal input 10, it will be understood by one of skill in the art that the invention can also be practiced without this feature by defining a set viewing zone or multiple set viewing zones. The invention utilizes a database of stereopairs or aspects which are also provided as an input 8 to the memory unit 12. Memory unit 12 has several functions. Initially memory unit 12 will extract and store a particular stereopair from the input 8 source (such as a database in memory or storage). This stereopair will correspond to an initial viewing position. As noted above, a viewer position sensor 10 can provide a viewer position signal to processor 14.

Generally, a minimum of two image information streams, corresponding to left eye and right eye images, are needed to generate a 3-D image in embodiments of the present invention. While above it was stated that the stereopair source images could be stored in and retrieved from a database in another memory or storage location (including stored previously in memory 12), the source image information may come ultimately from a variety of sources. For example, the information streams may include one or more pairs of camcorders or paired video streams for live 3-D video or recorded 3-D video, left and right images of one object (e.g., for photos) and left and right views from a digital 3-D scene (e.g., for games).

All during the viewing session, the viewer position signal 10 is constantly monitored and provided to processor 14. Depending upon the viewer position and subsequent error processing as noted (below), information from processor 14 regarding viewer position 10 (or preset location of the user for stationary viewing zones) is provided to memory 12 for subsequent extraction of the stereopair aspects from the database and recalculation of derived images for the displays 4 and 6. Thus the present invention can constantly provide an updated series of stereopairs to the processor based upon the input viewer position signal if the viewer desires to see the 3-D object from various positions. If the viewer desires to see a single 3-D view of an object, regardless of the viewing position, the viewer position signal input 10 can be used to determine the optical geometry used in the required processing. As will be readily appreciated by one skilled in the art, multiple viewer position signals can similarly be used to created multiple viewing zones (including with different images or image aspects) as is described below.

Memory 12 provides the desired stereopair to the processor 14 to produce calculated images. The calculated images can be directly sent from processor 14 to LCD panel and lighting unit control 16 or stored in memory 12 to be accessed by control unit 16. Unit 16 then provides the calculated images to the appropriate liquid crystal cell layers 4 and 6 within the composite LCD panel 5 as well as controls the lighting from source 2 that illuminates the layers 4 and 6. Processor 14 can also provide instructions to LCD and lighting control unit 16 to provide the appropriate illumination.

It should be noted that memory 12 holds the accumulated signals of individual cells or elements of each liquid crystal cell layer. Thus the memory unit 12 and processor 14 have the ability to accumulate and analyze the light that is traveling through relevant screen elements of the composite LCD panel toward the right and left eyes of the viewer which are identified by the processor 14 based upon the set viewing zone(s) or the viewer position signal 10.

Figure 13:
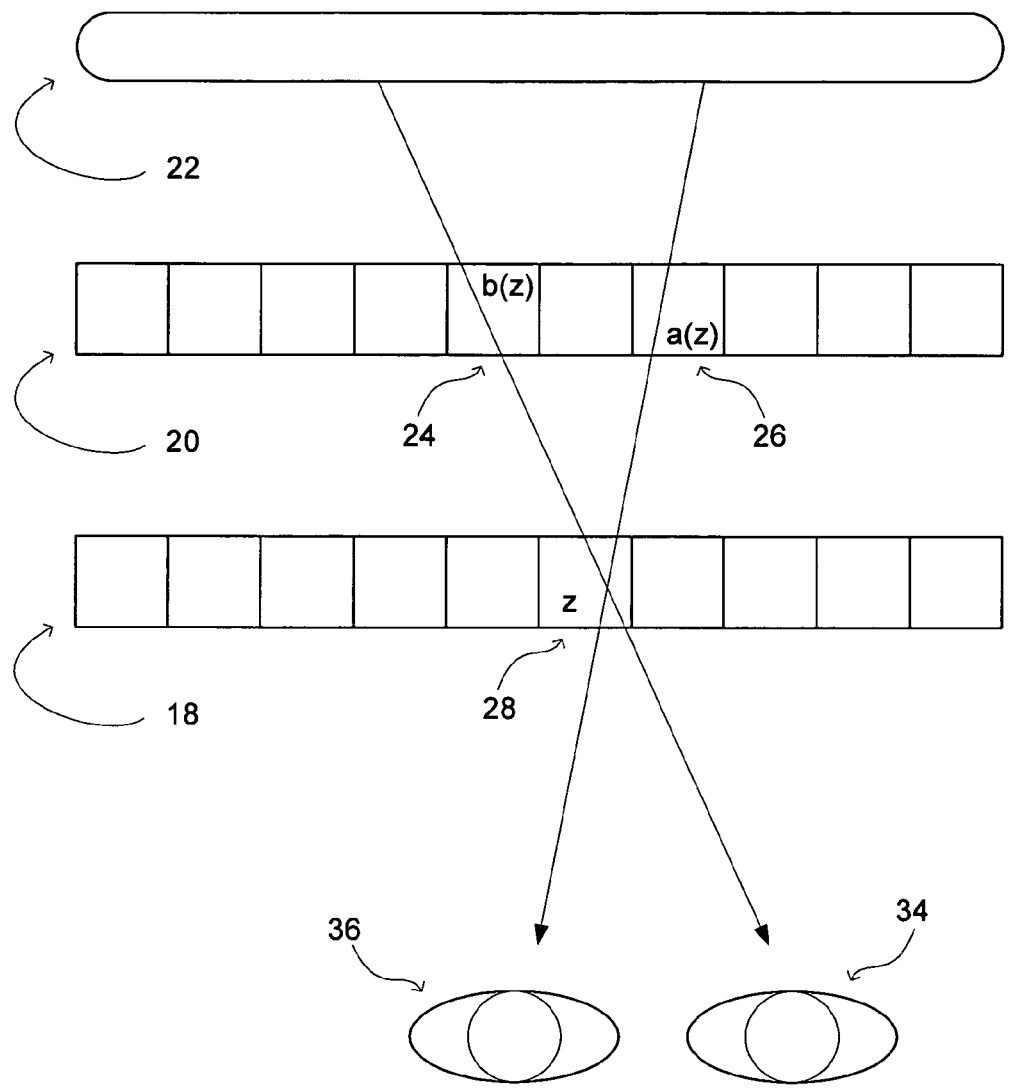
FIG. 13 is a schematic diagram that depicts the light beam movement from various liquid crystal cells of the composite LCD panel to a viewer's eyes in accordance with embodiments of the invention.

FIG. 13 schematically depicts the light beam movement from display panels to a viewer's eyes. As illustrated in FIG. 13, two light beams will come from back lighting source 22 through the arbitrary cell z 28 on the near liquid crystal cell layer 18 in order to come through the pupils of eyes 34 and 36. These beams will also first cross distant liquid crystal cell layer 20 at the points a(z) 26 and b(z) 24. The image in the left eye 36 is a computation of:

$$SL_z = N_z * D_{a(z)},$$

where N is the intensity of the pixel on the near layer 18 and D is the intensity of the pixel on the distant layer 20.

For right eye 34, respectively, the computation is:

$$SR_z = N_z * D_{b(z)}.$$

When light is directed through all the pixels z(n) of near cell layer 18, the images SL and SR are formed on the retinas of the viewer. The aim of the calculation is a optimizing of the calculated images on the near and distant layers 18 and 20 to obtain SL→L, and

SR→R.

One can prove that it is impossible to obtain an exact solution for the arbitrary L and R images. That is why the present invention seeks to find an approximated solution in the possible distributions for N and D to produce a minimum quadratic disparity function (between target and calculated images):

$$\rho(SL - L) \xrightarrow[N,D]{} \min$$

$$\rho(SR - R) \xrightarrow[N,D]{} \min$$

where ρ(x) is a function of the disparity, such as, for example, a quadratic function of the form $$\rho(x) = x^2,$$

with the limitation of pixel intensity to $0 \leq N \leq 255$, $0 \leq D \leq 255$.

An artificial Neural Network ("NN"), such as described below with respect to FIG. 9, may be used for this problem solving because it permits parallel processing and DSP integration.

Figure 14:
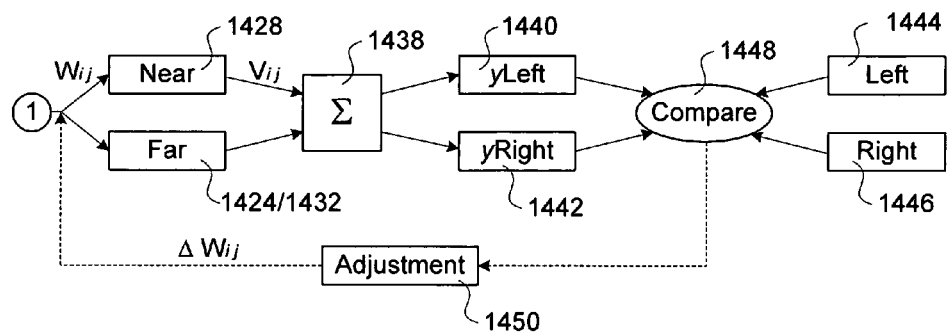
FIG. 14 is a logical flow diagram illustrating the data flow for the operation of a display control program utilized in an autostereoscopic 3-D display system.

Referring now to FIG. 14, the data flow for the manipulation of the images of the present invention is illustrated. As noted earlier the memory unit 12, processor 14, and LCD control and luminous control 16 regulate the luminous radiation emanating from source 22 and the transmissivity of the distant layer 20 and the near layer 18.

Information concerning multiple discreet two dimensional (2-D) images (i.e., multiple calculated images) of an object, each of which is depicted in multiple different areas on the LCD screens, and, optionally, information about positions of the right and left eyes of the viewer are adjusted by the processor 14.

Signals corresponding to the transmission of a portion of near layer 18 (signal 1428) and the transmissivity of the distant layer 20 corresponding to the luminous radiation of those portions of the image of the left and right eye respectively (signals 1424 and 1432) are input to the processor following the set program. The light signals from the cells of all layers that are directed toward the right and left eye of each viewer are then identified. In this example signals from cells 28 and 26 are all directed toward the left eye of the viewer 36 and signals from block 28 and 24 are directed the right eye of the viewer 34.

Each of these left and right eye signals is summed 1438 to create a value for the right eye 1442 and for the left eye 1440. These values are then compared in a compare operation 1448 to the relevant parts of the image of each aspect and to the relevant areas of the image of the original source object aspects 1444 and 1446. An adjustment 1450 would then be made to the original values in an attempt to reduce the error.

Keeping in mind that the signal is a function of the location of the viewer's eyes, the detected signal can vary to some extent. Any errors from the comparison are identified for each cell of the near and distant liquid crystal cell layers. Each error is then compared to the set threshold signal and, if the error signal exceeds the set threshold signal, the processor control changes the signals corresponding to the luminous radiation of at least part of the distant layer 20 cells as well as changes the transmissivity of at least part of the near layer 18 cells.

If the information concerning the calculated images of the object changes, as a result of movement of the viewer position, the processor senses that movement and inputs into the memory unit signals corresponding to luminous radiation of the distant layer cells as well as the transmissivity of the near layer cells until the information is modified. When the viewer position varies far enough to require a new view, that view or image is extracted from the database and processed.

Figure 15:
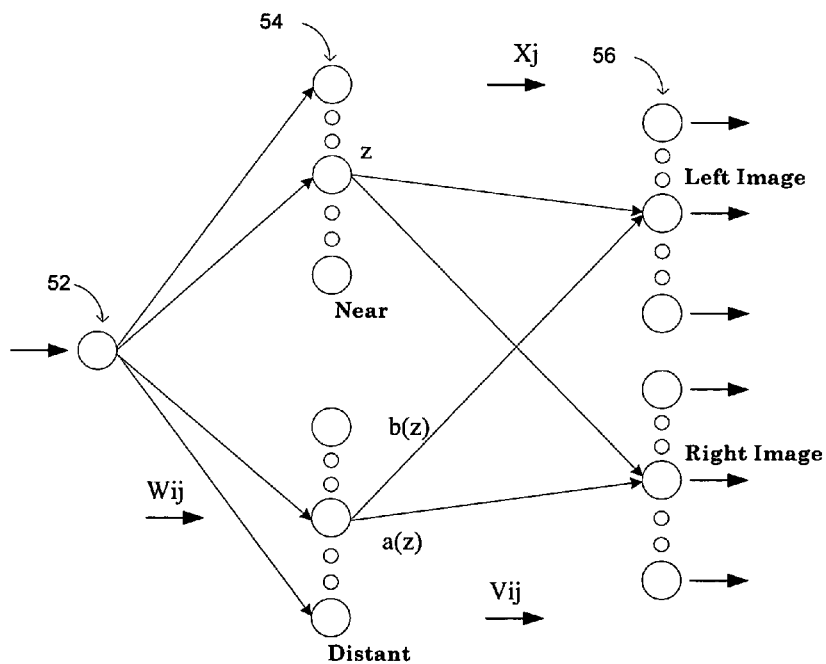
FIG. 15 is a schematic diagram illustrating a neural network diagram used to determine image data in an autostereoscopic 3-D display system.

FIG. 15 shows a neural network architecture that is applied to the problem described above in accordance with an embodiment of the invention. In calculating the images on the far and near screens, it helps to assume that there are L and R, a left and a right pair of stereo source images, and a constant viewing-zone (assuming the viewer's eye position is constant). A neural network of the invention replicates the function of the human eye by generating an image through two liquid crystal cell layers. To generate these images, the neural algorithm reduces the differences between the original light field of the object (the source images) and the light field generated by the stacked liquid crystal cell layers. The difference between the light fields is called the maximum exactness (or minimum error), and is reduced until sufficient exactness within the range of human perception is achieved. The neural network architecture shown in FIG. 15 is a three layer neural network. An input layer 52 consists of one neuron that spreads the unit excitement to the neurons of the hidden layer 54. The neurons of the hidden layer 54 form two groups that correspond to the near and distant layers. The neurons of an output layer 56 forms two groups that correspond to images SL and SR. The number of neurons corresponds to the number of liquid crystal layer pixels. Synaptic weights Wij that corresponds to the near and distant layers is an adjusting parameter. Synaptic interconnection between hidden layer neurons corresponds to the optical scheme of the system:

$$V_{j,k} = \begin{cases} 1 & -\text{if } j = k \;\&k, a(k), b(k) \text{ is on the same line} \\ & \text{or } j = k \;\&k, c(z), d(z) \text{ is on the same line} \\ 0 & -\text{otherwise} \end{cases}$$

Nonlinear functions are a sigmoid function in the value [0-255]:

$$F(x) = \frac{255}{1+e^{-x}},$$

or a saturation function of the form $$F(x) = \begin{cases} 0 & -\text{if } x < 0 \\ x & -\text{if } 0 \le x \le 255 \\ 255 & -\text{if } x > 255 \end{cases}$$

The functioning of the NN can be described by:

$$X_j = F\left(\sum_j W_{ij} Inp_i\right) = F(W_{ij}) = \begin{cases} D_j & -\text{if } j \in D \\ N_j & -\text{if } j \in N \end{cases} \text{- outputs of hidden layer.}$$

$$Y_k = F\left(\sum_k V_{ik} X_j\right) \text{- outputs of the } NN.$$

The output signal in any neuron is a summation of at least one signal from the distant and near layers. The output of the NN corresponding to the left and right eye of the viewer, is $$Y_k(\text{left})=F(X_z*X_{a(z)})=F(N_z*D_{a(z)})$$

$$Y_k(\text{right})=F(X_z*X_{b(z)})=F(N_z*D_{b(z)}).$$

The error function is:

$$E = \sum_k \rho(Y_k(\text{left}) - L_k) + \sum_k \rho(Y_k(\text{right}) - R_k)$$

that is the summation of all the errors. From above, it is evident that when E→0 while NN learning, the output of the hidden layer will correspond to the desired calculated images to be illuminated on the screens.

In the initial step of NN learning, the weights Wij have random values. For acceleration of the learning process, weights can be initialized in accordance with the initial selected stereopair. A back propagation method (BackProp) was used to teach the NN:

$$W_{ij}(\text{new}) = W_{ij}(\text{old}) - \alpha \frac{dE}{dW_{ij}}$$

where α accounts for the velocity of the learning. An acceptable accuracy can typically be obtained at 10-15 iterations, and for some images the extremely low errors can be achieved in 100 iterations. The calculations show the strong dependence between the level of errors and the parameters of the optical scheme, such as the shape of the L and R images, the distance between the near and distant cell layers, and the viewer eye position.

For obtaining more stable solutions for small variations of the optical parameters, two alternative methods can be used. The first method involves modification of the error function, by adding a regularization term:

$$E = \sum_k \rho(Y_k(\text{left}) - L_k) + \sum_k \rho(Y_k(\text{right}) - R_k) + \beta \frac{W_{ij}^2}{2}$$

where β—is a regularization parameter.

The second method involves randomly changing the position of the viewer eye by a small amount during the training of the NN. Both of these methods can be used for enlarging of the area of stereo viewing.

Training methods other than "BackProp" can also be used, for example, a conjugated gradients method:

$$W_{ij}(t) = W_{ij}(t-1) + \alpha(t)S_{ij}(t-1),$$

$$S_{ij}(t) = -G_{ij}(t) + \frac{\|G_{ij}(t)\|^2}{\|G_{ij}(t-1)\|^2} S_{ij}(t-1)$$

$$G_{ij}(t) = \frac{dE}{dW_{ij}}$$

which is a variant of Fletcher-Reeves. This will accelerate the training procedure 5-10 times.

A typical liquid crystal cell layer suitable for use in the present invention corresponds to a 15" (or larger) active-matrix liquid crystal display layer providing a resolution of 1024×768 or greater. In a composite LCD panel utilizing such a 15" cell layers, preferably the distance between the layers is less than approximately 5 mm. A suitable computer system includes an Intel Pentium III-500 MHz equivalent or faster processor, for stereo image processing, and the mask comprises a diffuser. The computer should be sufficient to emulate the neural network for obtaining the calculated images that must be illuminated on the near and distant screens in order to obtain separated left-right images in predefined areas. The neural network emulates the optical interaction of the displayed derived images as described above and takes into account the viewer's eye position in order to minimize the errors in the stereo image and dynamically produce a perceived 3-D image.

Given the compact nature of the arrangement of multiple liquid crystal cell layers in certain embodiments of the invention, it is important to provide suitable cooling for the composite LCD panel to prevent overheating. One way suitable cooling can be provided is by utilizing an arrangement of fans within the display casing (which typically, in commercial embodiments, would encase at least the composite LCD panel and light source) to provide a cooling cross-flow of air.

As described above, the inclusion of a means for inputting a viewer position signal enables display systems according to the present invention to use both a set image viewing zone (or zones) or no zones that allow viewers to move without losing 3-D effect. The algorithms used to determine components of the derived images (such as SL and SR above) use variables for the optical geometry, and the viewer position signal is used to determine those variables. Also, the viewer position signal may be used to determine which stereopair to display, based on the optical geometry calculation, when the display is in a mode that allows viewer position changes to change the image view or perspective seen by the viewer. Numerous known technologies can be used for generating the viewer position signal, including known head/eye tracking systems employed for virtual reality (VR) applications, such as, but not limited to, viewer mounted RF sensors, triangulated IR and ultrasound systems, and camera-based machine vision using video analysis of image data.

The signals corresponding to the transmissivity of the near and distant layers' cells are input into the memory unit by means of the processor following the set program. The next step is to identify the light signals that can be directed from the cells of all the stacked liquid crystal cell layers towards the right and left eyes of at least one viewer. Then compare the identified light signals directed towards each eye to the corresponding areas of the set 2-D stereopair images of the relevant object.

For each cell of each layer, the error signal is identified between the identified light signal that can be directed towards the relevant eye and the identified relevant area of the stereo picture of the relevant object aspect that the same eye should see. Each received error signal is compared to the set threshold signal. If the error signal exceeds the set threshold signal, the mentioned program of the processor control modifies the signals corresponding to the layer cells. The above process is repeated until the error signal becomes lower than the set threshold signal or the set time period is up.

It is also possible to solve the calculations for the case of two (or more) different objects reconstructed in two (or more) different directions for two (or more) viewers. It must be mentioned specifically that all calculations can be performed in parallel utilizing, for example, DSP processors designed for this purpose. Thus, the present invention can be used for multi-viewing display emulation. It should also be noted that the system of the present invention may also be used with multiple viewers observing imagery simultaneously. The system simply recognizes the individual viewers' positions (or sets specific viewing zones) and displays images appropriate for the multiple viewers.

The algorithm in accordance with the invention can be adapted for use with different hardware configurations including a computer central processing unit (e.g. Intel chips) and 3-D video cards (e.g., nVidia GeForce, or ATI Radeon) supporting dual monitor configurations. Furthermore, hardware such as known 3-D accelerators can be used operate the algorithm more quickly.

As will be readily appreciated by one skilled in the area, 3-D displays created according to the principles of the present invention can be adapted to operate in several different modes. Such displays can work in stereo and multi-zone modes (M screens to provide views to N zones), in a more traditional electronic parallax barrier or lenticular stereo display mode, a dynamic noise stereo display mode (i.e., providing dynamic noise in a front screen and calculated images in second screen), a RF secure display mode (i.e., placing a specialized image in the front panel to make the back image visible for user, but invisible for radio—frequency screening) and a multi-user/multi-view (or "Family") display mode. Further, the 3-D images produced by the present invention can be further enhanced by application of known regularization processes.

Figure 16:
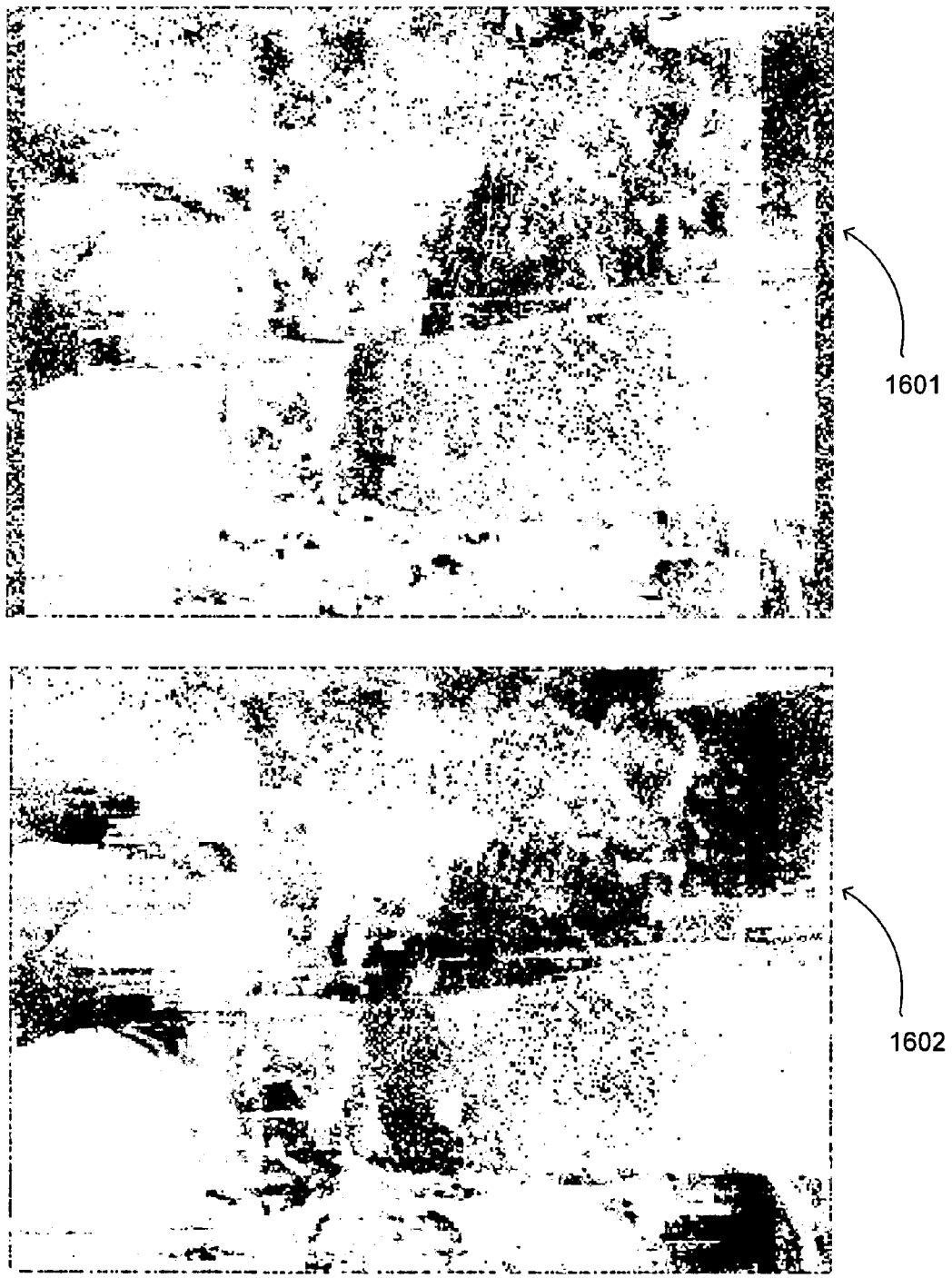
FIG. 16 and FIG. 17 are illustrations of exemplary images produced utilizing the multi-user and multi-view mode of an autostereoscopic 3-D display system display for generating 3D images.
Figure 17:
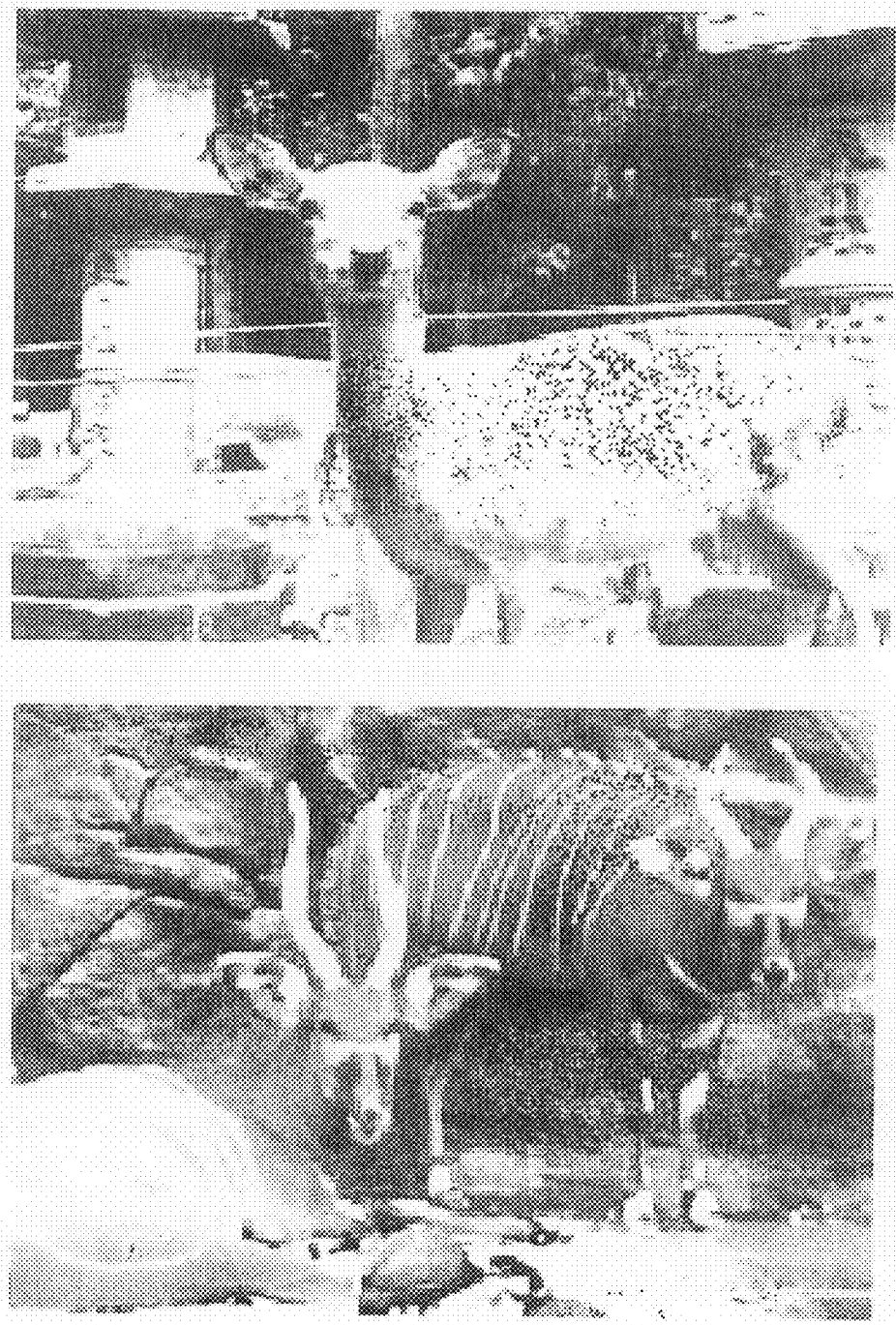

FIG. 16 and FIG. 17 provide illustrations of the images encountered in a "Family" mode display. In this example, different members of a viewing group (e.g. where the group is a "family") each see different aspects of the same image, or different images altogether, based on any number of factors such as, but not limited to viewing location or angle. As depicted in FIG. 16, the derived images 1601 and 1602 actually displayed on the liquid crystal cell layers of the composite LCD panel create a completely different perceived image 1703 for the first viewer (see FIG. 17), located at a first viewing position, and a second perceived image 1704 for a second viewer, located at a viewing position different from the first viewing position. The images for each viewer can both be stereoscopic (3-D), both be two-dimensional, or be a mixture of the two. As the number of viewers and different independent views increases, improved image quality can be obtained by increasing the number of liquid crystal cell layers within a composite LCD panels, or alternatively the number of composite LCD panels themselves, to increase the overall amount of image data that can be relayed to the viewers.

As will be readily appreciated by one skilled in the art, in certain embodiments of the invention, the light source can be a substantially broadband white-light source, such as an incandescent lamp, an induction lamp, a fluorescent lamp, or an arc lamp, among others. In other embodiments, light source could be a set of single-color sources with different colors, such as red, green, and blue. These sources may be light emitting diodes ("LEDs"), laser diodes, or other monochromatic and/or coherent sources.

In embodiments of the invention, the liquid crystal display panels comprise switchable elements. As is known in the art, by adjusting the electric field applied to each of the individual color panel pairs, the system then provides a means for color balancing the light obtained from light source. In another embodiment, each color panel system can be used for sequential color switching. In this embodiment, the panel pairs include red, blue, and green switchable panel pairs. Each set of these panel pairs is activated one at a time in sequence, and display cycles through blue, green, and red components of an image to be displayed. The panel pairs and corresponding light sources are switched synchronously with the image on display at a rate that is fast compared with the integration time of the human eye (less than 100 microseconds). Understandably, it is then possible to use a single pair of monochromatic displays (i.e., LCDs lacking a color filter) to provide a color three-dimensional image.

Utilizing a composite LCD panel in this technique improves the image quality in comparison with parallax barrier systems due to the total use of the cells of all the layers for the information transmission. The preferred embodiments disclosed can also identify the number of the viewers as well as the positions of the right and left eyes of each viewer and perform the above-mentioned procedures to realize the techniques in accordance with the identified eye positions of all the viewers. Such a system makes it possible for several viewers to receive visual information with the perception of the stereoscopic effect simultaneously.

The system and related methods having been shown and described herein, it will be apparent to those skilled in the art that other embodiments of the present invention are possible without departing from the scope of the invention as disclosed and claimed.

What is claimed is:

1. A method of displaying a three-dimensional image, said method comprising:
   determining at least one viewing zone located in front of a composite liquid crystal display panel, said composite liquid crystal display panel containing at least two independent liquid crystal cell layers capable of imaging two different images, said cell layers spaced one in front of another relative to said viewing and adapted to independently produce different images from one another;
   selecting a pair of source stereopair images;
   producing two calculated images derived from said source stereopair images and positioning of said viewing zone and said layers, said calculated images being derived by a processor so that they act as a mask for each other when imaged on said layers, a first one of said calculated images being adapted for a front one of said layers and a second one of said two calculated images being adapted for a rear one of said layers;
   displaying said calculated images on each said cell layer; and
   backlighting said cell layers with an illumination source to display a stereoscopic image visible in said at least one viewing zone wherein said visible image corresponds to a selected pair of source stereopair images.

2. The method of claim 1, wherein said displayed images are calculated images processed from said source stereopair images, and wherein processing for each said calculated image comprises iteratively:
   estimating the light directed to each one of a viewer's eyes by calculating interim calculated images for each of said cell layer, and then determining the light directed through each of a plurality of discrete pixels of a front one of said cell layers;
   comparing the estimated light for each pixel with the equivalent light from the selected one of said stereopair images to determine an error;
   adjusting said interim calculated images to reduce said error; and
   accepting said interim calculated images as said calculated images once said error for each pixel is below a set limit.

3. The method of claim 2, wherein said processing of said selected source stereopair images is performed by an artificial neural network.

4. The method of claim 1, wherein said at least one viewing zone is determined by a calculation responsive to a sensed viewer position signal.

5. The method of claim 1, wherein said at least one viewing zone is continuously monitored by an automated viewer position sensor that generates a signal used in producing said calculated images.

6. The method of claim 1, wherein said calculated images are processed according to a plurality of viewing zones.

7. The method of claim 1, further comprising selecting a plurality of said stored stereopair images for display to a plurality of viewing zones, and wherein said two calculated images are produced by processing said selected stereopair images.

8. The method of claim 1, wherein an input orientation surface of a first one of said liquid crystal cell layers in said composite liquid crystal panel is arranged orthogonally with respect to polarization to an input orientation surface of a second one of said cell layers.

9. The method of claim 8, wherein said cell layers are separated by transparent glass.

10. The method of claim 1, wherein said liquid crystal cell layers are of the active matrix type.

11. The method of claim 1, wherein said selecting of said source stereopair images is performed according to said determined viewing zone, and wherein movements of said selected viewing zone impacts said selecting of said one of said stereopair images.

12. The method of claim 11, wherein said changing of said source stereopair images comprises selecting a different source stereopair that corresponds to a different perspective of said selected source stereopair.

13. The method of claim 1, wherein said viewing zone is determined automatically to correspond to a variable position of an intended viewer of said visible image, and wherein said selected source stereopair images are changed as the position of said viewer varies.

14. The method of claim 13, wherein said changing of said source stereopair images comprises selecting a different source stereopair that corresponds to a different perspective of said selected source stereopair.

15. The method of claim 1, further comprising determining at least two viewing zones and selecting at least two pairs of source stereopair images, a first pair of said selected source stereopair images corresponding to a first determined viewing zone and a second pair of said selected source stereopair images corresponding to a second determined viewing zone such that said calculated stereopair images causes said displays to create two different visible stereoscopic images, a different one of said two different stereoscopic images being visible in each said at least two viewing zones wherein said visible images corresponds to said selected pairs of source stereopair images.

16. A dynamic three-dimensional image display, comprising:
a source of stereopair images;
a composite liquid crystal display panel containing at least two transmissive liquid crystal cell layers, said layers spaced one in front of another relative to a display viewing area and adapted to independently produce different images from one another;
an illumination source to backlight said cell layers to said display viewing area;
a processor; and
a video controller electronically interfaced with said displays, said illumination source and said processor;
wherein said processor operates logic adapted to determine at least one viewing zone within said viewing area, to select a pair of source stereopair images, and to produce two calculated images derived from said source stereopair images and said relationship of said viewing zone and said layers, said calculated images being derived so that they act as a mask for each other when imaged on said layers, a first one of said calculated images being adapted for a front one of said layers and a second one of said two calculated images being adapted for a rear one of said layers; and
wherein said video controller receives calculated image data from said processor and causes each display to generate an appropriate one of said calculated images such that each displayed calculated image acts as a mask for the other displayed calculated image to display an three-dimensional image visible in said at least one viewing zone, said visible image corresponding to said selected pair of source stereopair images.

17. The display of claim 16, wherein said processor logic for deriving each said calculated image comprises the iterative process of:
estimating the light directed to each one of a viewer's eyes by calculating interim calculated images for each of said layers, and then determine the light directed through each discrete pixel of said front layer;
comparing the estimated light for each pixel with the equivalent light from the selected ones of said stereopair images to determine an error;
adjusting said interim calculated images to reduce said error; and
accepting said interim calculated images as said calculated images once said error for each pixel is below a set limit.

18. The display of claim 17, wherein said means for processor logic for deriving each said calculated image is performed by said processor by emulating an artificial neural network.

19. The display of claim 16, further comprising a viewer position sensor that provides a signal for said processor to determine said least one viewing zone based upon the sensed position of a viewer.

20. The display of claim 19, wherein selecting of said source stereopair images is dependent upon a location of said determined viewing zone, and wherein movements of said selected viewing zone impacts said selecting of said one of said stereopair images.

21. The display of claim 16, wherein said viewing zone is a stationary viewing zone preset in a memory accessible by said processor.

22. The display of claim 16, wherein said processor logic derives said calculated images such that they can be displayed to a plurality of viewing zones to create an three-dimensional image visible in each of said plurality of viewing zones.

23. The display of claim 16, wherein said processor logic for selecting is adapted to select a plurality of said stereopair images, and where said means for processing is further adapted to process said plurality of selected stereopair images to calculate said calculated images such that they can be displayed to a plurality of viewing zones to create a plurality of aspects of a three dimensional image visible in said viewing zones.

24. The display of claim 16, wherein said liquid crystal cell layers each contain an input orientation surface corresponding to a polarization direction, and wherein said composite liquid crystal panel is constructed whereby the input orientation surface of a first one of said cell layers is arranged orthogonally with respect to polarization to the input orientation surface of a second one of said cell layers.

25. The display of claim 24, wherein said cell layers are separated by a hard and optically transparent material.

26. The display of claim 16, wherein said liquid crystal cell layers are of a type suitable for active matrix liquid crystal displays.

27. The display of claim 16, wherein said viewing zone is determined automatically to correspond to a variable position of an intended viewer of said visible image, and wherein said selected source stereopair images are changed by said processor as the position of said viewer varies.

28. The display of claim 27, wherein said processor changes said source stereopair images by selecting a different source stereopair that corresponds to a different perspective of said selected source stereopair.

29. The display of claim 27, wherein said changing of said source stereopair images comprises selecting a different source stereopair that corresponds to a different perspective of said selected source stereopair.

30. The display of claim 16, wherein said processor logic is further adapted to determine at least two viewing zones within said viewing area and to select at least two pairs of source stereopair images, a first pair of said selected source stereopair images corresponding to a first determined viewing zone and a second pair of said selected source stereopair images corresponding to a second determined viewing zone such that said calculated stereopair images causes said displays to create two different visible stereoscopic images, a different one of said two different stereoscopic images being visible in each said at least two viewing zones wherein said visible images corresponds to said selected pairs of source stereopair images.

31. The display of claim 16, further comprising a memory in communication with said processor; said memory containing a database of various pairs of source stereoscopic images.

32. The display of claim 16, further comprising a mechanism for receiving source stereoscopic images input selected from the group consisting of one or more pairs paired video streams, one or more paired images of objects, and one or more paired views of 3-D scenes.

* * * * *